US009052392B2

(12) United States Patent (10) Patent No.: US 9,052,392 B2
Inomata et al. (45) Date of Patent: Jun. 9, 2015

(54) VELOCITY MEASUREMENT APPARATUS CAPABLE OF ACCURATELY MEASURING VELOCITY OF MOVING OBJECT RELATIVE TO GROUND SURFACE

(75) Inventors: Kenji Inomata, Tokyo (JP); Masahiro Watanabe, Tokyo (JP); Hiroshi Araki, Tokyo (JP); Takahisa Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 862 days.

(21) Appl. No.: 13/296,837

(22) Filed: Nov. 15, 2011

(65) Prior Publication Data

US 2012/0136621 A1 May 31, 2012

(30) Foreign Application Priority Data

Nov. 25, 2010 (JP) .................................. 2010-261919
Nov. 25, 2010 (JP) .................................. 2010-261920

(51) Int. Cl.
*G01P 3/50* (2006.01)
(Continued)

(52) U.S. Cl.
CPC .............. *G01S 13/605* (2013.01); *G06F 19/00* (2013.01);
(Continued)

(58) Field of Classification Search
CPC ....... B61L 25/00; B61L 25/02; B61L 25/021; B61L 25/025; G01D 7/00; G01D 9/00; G01D 21/00; G01P 3/00; G01P 3/36; G01P 3/42; G01P 3/50; G01P 3/64; G01P 3/66; G01P 3/68; G01P 3/80; G01S 7/00; G01S 7/024; G01S 7/025; G01S 13/00; G01S 13/02; G01S 13/50; G01S 13/58; G01S 13/60; G01S 13/605; G01S 13/64; G06F 11/00; G06F 11/32; G06F 11/34; G06F 15/00; G06F 15/26; G06F 17/00; G06F 17/10; G06F 17/40; G06F 19/00

USPC .................. 73/432.1, 488, 489, 865.8, 865.9, 73/866.3; 250/526; 324/160, 178; 342/104, 109, 118, 123; 382/100, 106, 382/107; 702/1, 127, 142, 143, 149, 187, 702/189; 708/100, 105, 200; 356/3, 27

See application file for complete search history.

(56) References Cited

U.S. PATENT DOCUMENTS

| | | | |
|---|---|---|---|
| 4,495,589 A | * | 1/1985 | Hirzel ........................... 702/144 |
| 7,797,995 B2 | * | 9/2010 | Schafer .......................... 73/146 |
| 2008/0256815 A1 | * | 10/2008 | Schafer .......................... 33/739 |

FOREIGN PATENT DOCUMENTS

JP 56-33557 4/1981
JP 58-206991 12/1983
(Continued)

OTHER PUBLICATIONS

Japanese Office Action issued Jan. 7, 2014, in Japan Patent Application No. 2010-261920 (with partial English translation).
(Continued)

*Primary Examiner* — Edward Cosimano
(74) *Attorney, Agent, or Firm* — Oblon, McClelland, Maier & Neustadt, L.L.P.

(57) ABSTRACT

A velocity measurement apparatus comprising: first and second surface profile sensors for acquiring first and second surface profile data, a memory for storing the first and second surface profile data, and a calculation unit for calculating a velocity of a moving object. Each surface profile sensors acquires the corresponding surface profile data by measuring signal levels of reflected waves corresponding to a radio wave emitted to a ground surface and then reflected from structures on the ground surface, and measuring propagation durations from the emission of the radio wave to the return of the respective reflected waves. The calculation unit compares the first and second surface profile data, determines a difference between their measurement times, and divides a distance between the first and second surface profile sensors by the difference between the measurement times to calculate the velocity of the moving object.

15 Claims, 28 Drawing Sheets

(51) Int. Cl.
*G06F 17/40* (2006.01)
*G06F 19/00* (2011.01)
*G01S 13/60* (2006.01)
*B61L 25/02* (2006.01)
*G01P 3/64* (2006.01)
*G01P 3/80* (2006.01)
*G01S 7/02* (2006.01)
*G01S 13/87* (2006.01)

(52) U.S. Cl.
CPC ............ *G01P 3/50* (2013.01); *G06F 17/40* (2013.01); *B61L 25/025* (2013.01); *G01P 3/64* (2013.01); *G01P 3/80* (2013.01); *G01S 7/025* (2013.01); *G01S 13/87* (2013.01)

(56) References Cited

FOREIGN PATENT DOCUMENTS

| | | |
|---|---|---|
| JP | 6-138221 | 5/1994 |
| JP | 10-39013 | 2/1998 |
| JP | 10-90435 | 4/1998 |
| JP | 2003-52105 | 2/2003 |

OTHER PUBLICATIONS

Office Action issued Feb. 18, 2014 in Japanese Patent Application No. 2010-261920 (with partial English translation).

\* cited by examiner

VELOCITY MEASUREMENT APPARATUS CAPABLE OF ACCURATELY MEASURING VELOCITY OF MOVING OBJECT RELATIVE TO GROUND SURFACE

TECHNICAL FIELD

The present invention relates to a velocity measurement apparatus to be installed on a moving object such as a vehicle, for measuring a velocity of the moving object relative to a ground surface.

BACKGROUND ART

Currently, there exist ground velocity detection apparatuses to be installed on a moving object such as a vehicle, for measuring a velocity of the moving object relative to a ground surface, e.g., the inventions disclosed in Patent Literatures 1 and 2.

The invention disclosed in Patent Literature 1 is provided with: a transmitter for generating a radio wave; an antenna for emitting the radio wave from a vehicle to a track surface; a mixer for mixing reflected power from the track surface with a part of transmitting power to obtain a Doppler signal component; and a pulse generator and a counter for detecting a signal at a certain level or more from the mixer's output and converting the signal into a pulse. The invention is configured to obtain a travel distance and a required time by measuring a number of pulses as well as start and end times of the pulses, and to derive a velocity of the vehicle from the travel distance and the required time.

The invention disclosed in Patent Literature 2 is provided with: a first ground distance sensor for measuring a distance to a ground surface; a second ground distance sensor separated from the first ground distance sensor by a predetermined distance in a traveling direction of a vehicle, the second ground distance sensor measuring a distance to the ground surface at a point remote from the first ground distance sensor by a predetermined distance; first ground surface tracing means for tracing a ground surface on which a vehicle travels, based on a distance signal from the first ground distance sensor; second ground surface tracing means for tracing the ground surface on which the vehicle travels, based on a distance signal from the second ground distance sensor; time delay detecting means for comparing a feature of the ground surface traced by the first ground surface tracing means with a feature of the ground surface traced by the second ground surface tracing means, and detecting a time difference when the first ground distance sensor passes a point and when the second ground distance sensor passes the point; and ground velocity detecting means for detecting a ground velocity of the vehicle from the time difference detected by the time delay detecting means and the distance between the first ground distance sensor and the second ground distance sensor.

Using the measured velocity, it is possible to calculate a travel distance from a predetermined reference point, or a total travel distance.

CITATION LIST

Patent Literature

PATENT LITERATURE 1: Japanese Patent Laid-open Publication No. S58-206991
PATENT LITERATURE 2: Japanese Patent Laid-open Publication No. H06-138221

SUMMARY OF INVENTION

Technical Problem

The invention disclosed in Patent Literature 1 determines the velocity based on the Doppler signal, and accordingly, in a case where the vehicle moves at low speed, a Doppler frequency becomes very low and thus immeasurable. Accordingly, in the invention disclosed in Patent Literature 1, there is a problem that the movement at low speed is judged as stop, thus resulting in an error in the total travel distance.

According to the invention disclosed in Patent Literature 2, each of the two ground distance sensors measures a distance to a ground surface immediately below, and accordingly, limited feature information about the ground surface can be acquired. Accordingly, in the invention disclosed in Patent Literature 2, an error may occur because only the limited feature information is available when measuring a velocity.

It is an object of the present invention is to solve the problems described above, and provide a velocity measurement apparatus capable of accurately measuring a velocity of a moving object relative to a ground surface.

Solution to Problem

According to an aspect of the present invention, a velocity measurement apparatus for measuring a velocity of a moving object relative to a ground surface is provided. The velocity measurement apparatus comprising: a first surface profile sensor provided on the moving object, the first surface profile sensor acquiring first surface profile data indicating a top profile of a longitudinal section of the ground surface; a second surface profile sensor provided on the moving object and separated from the first surface profile sensor by a predetermined distance in a traveling direction of the moving object, the second surface profile sensor acquiring surface profile data indicating a top profile of a longitudinal section of the ground surface; a memory for accumulating first surface profile data acquired by the first surface profile sensor at different measurement times to store the accumulated first surface profile data as first accumulated data, and accumulating second surface profile data acquired by the second surface profile sensor at different measurement times to store the accumulated second surface profile data as second accumulated data; and a calculation unit for calculating a velocity of the moving object based on the first and second accumulated data stored in the memory. Each of the first and second surface profile sensors acquires the corresponding one of the first and second surface profile data by measuring signal levels of reflected waves corresponding to a radio wave emitted to the ground surface and then reflected from a plurality of structures on the ground surface, and measuring propagation durations from the emission of the radio wave to the return of the respective reflected waves. The calculation unit compares the first accumulated data with the second accumulated data, determines a difference between the measurement times of the first and second surface profile data similar to each other, and divides the distance between the first and second surface profile sensors by the difference between the measurement times to calculate the velocity of the moving object.

Advantageous Effects of Invention

According to the present invention, it is possible to provide a velocity measurement apparatus capable of accurately measuring a velocity of a moving object relative to a ground surface. Further, it is possible to calculate a total travel distance from a predetermined reference point by integrating the measured velocity. Further, if a route of movement is known in advance, it is also possible to determine a current position from the calculated total travel distance.

BRIEF DESCRIPTION OF DRAWINGS

FIG. 18 shows propagation paths 167 to 169 in a case of receiving radio waves reflected outside an exposed area 103 of the sensor 11a;

DESCRIPTION OF EMBODIMENTS

Figure 1:
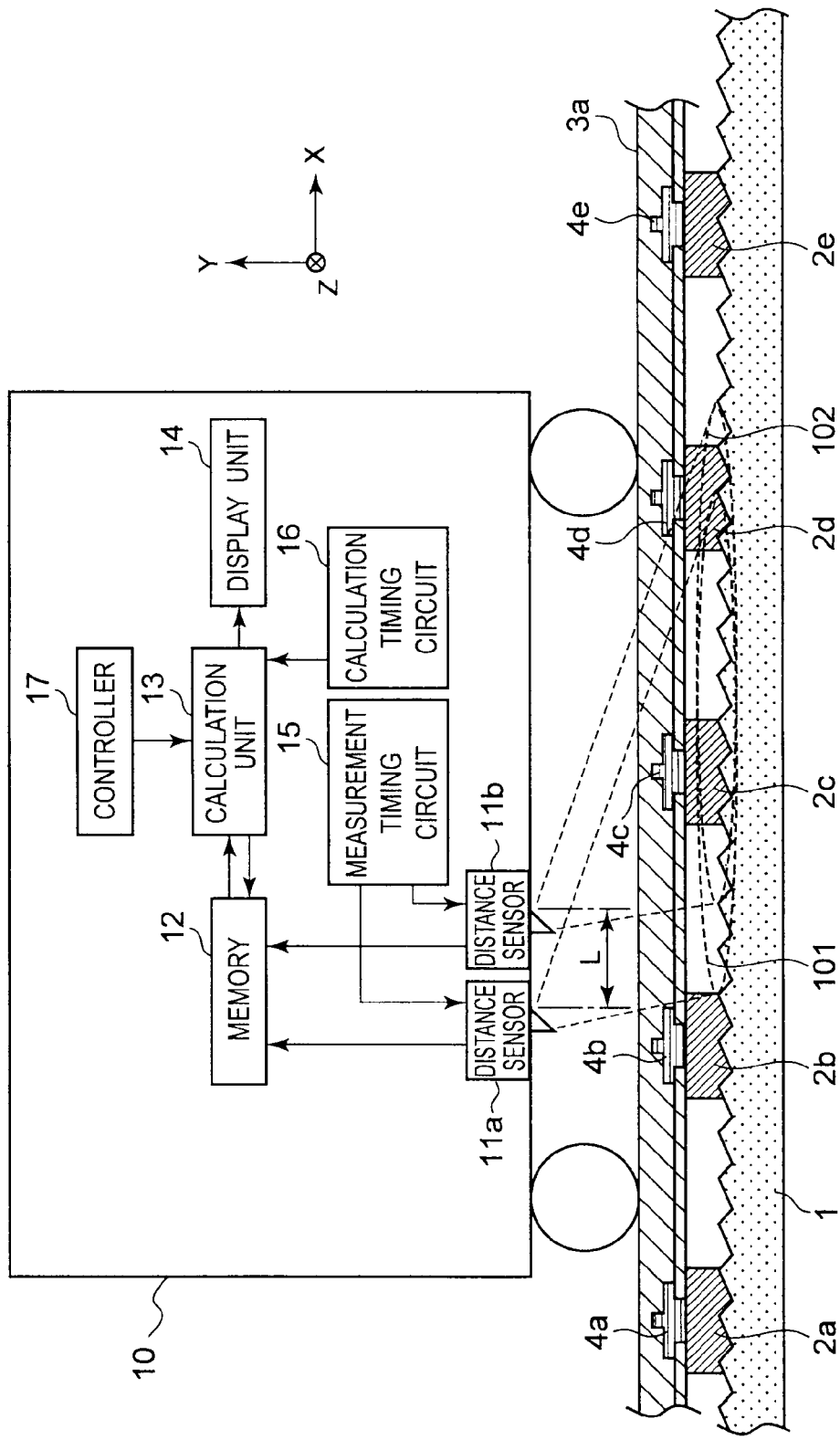
FIG. 1 is a schematic diagram showing a configuration of a vehicle 10 equipped with a velocity measurement apparatus according to a first preferred embodiment of the present invention.

Hereinafter, with reference to the drawings, description will be given of a velocity measurement apparatus according to preferred embodiments of the present invention. In the respective drawings, identical reference numbers denote similar constituent elements. Reference is made to XYZ coordinates in the drawings.

First Preferred Embodiment

FIG. 1 is a schematic diagram showing a configuration of a vehicle 10 equipped with a velocity measurement apparatus according to a first preferred embodiment of the present invention. The velocity measurement apparatus according to the first preferred embodiment is installed on the vehicle 10 that travels on a track, and measures a velocity of the vehicle 10 relative to a ground surface. It is assumed that the vehicle 10 travels in a +X direction in FIG. 1. The track includes the ground 1, rail ties 2a to 2e, rails 3a and 3b (see FIG. 2), and fastening devices 4a to 4j (see FIG. 2). The rails 3a and 3b are secured to the rail ties 2a to 2e with the fastening devices 4a to 4j. The vehicle 10 includes: two distance sensors 11a and 11b each acquiring surface profile data indicating a profile of the ground surface (e.g., a top profile of a longitudinal section of the ground surface); a memory 12 for storing the surface profile data; a calculation unit 13 for calculating a velocity and a total travel distance of the vehicle 10; a display unit 14 for displaying the calculation results; a measurement timing circuit 15 for periodically generating timing pulses for the distance sensors 11a and 11b (hereinafter, referred to as measurement pulses); a calculation timing circuit 16 for periodically generating timing pulses for the calculation unit 13 (hereinafter, referred to as calculation pulses); and a controller 17 for inputting to the calculation unit 13 a start point pulse indicating a start point for the total travel distance.

The distance sensors 11a and 11b are provided on a bottom surface of the vehicle 10, at substantially the same height from the ground 1, such that the distance sensors 11a and 11b are separated from each other by a predetermined distance "L" in a traveling direction of the vehicle 10. Each of the distance sensors 11a and 11b acquires surface profile data by measuring signal levels of reflected waves corresponding to a radio wave emitted to the ground surface and then reflected from various structures on the track (i.e., various structures having different distances to the distance sensor, respectively), and measuring propagation durations from the emission of the radio wave to the return of the respective reflected waves. The propagation durations can be used to determine the distances from each of the distance sensors 11a and 11b to the ground 1, the rail ties 2a to 2e, and the fastening devices 4a to 4j. If a reflected wave having a certain propagation duration has a high signal level, it indicates that there is a characteristic reflective object (i.e., the rail ties 2a to 2e, the fastening devices 4a to 4j, and the like) on the ground surface at a distance corresponding to the propagation duration. The distance L between the distance sensors 11a and 11b is set to an interval shorter than a half of an interval between two adjacent ones of the fastening devices 4a to 4j in the traveling direction of the vehicle 10. Preferably, the interval between two adjacent ones of the fastening devices 4a to 4j is about 50 to 60 cm, and the distance L between the distance sensors 11a and 11b is about 15 to 25 cm. The measurement timing circuit 15 periodically generates the measurement pulses for instructing each of the distance sensors 11a and 11b to start the measurement. The measurement pulses are sent to the respective distance sensors 11a and 11b at different instants in order to prevent that the distance sensors 11a and 11b start the measurement simultaneously (i.e., emit radio waves simultaneously). The time difference of sending the measurement pulses is sufficiently smaller than a time for the vehicle 10 to travel by the distance L, and is substantially negligible. The memory 12 stores and accumulates the surface profile data measured by the respective distance sensors 11a and 11b per each measurement pulse. The calculation unit 13 calculates a velocity and a total travel distance of the vehicle 10, by executing a velocity and distance calculation process (which will be described later with reference to FIG. 8) based on the surface profile data stored in the memory 12, each time receiving the calculation pulse. The controller 17 generates a start point pulse indicating a start point of the total travel distance and inputs the start point pulse to the calculation unit 13, in response to a reset signal or the like from an external reset button (not shown).

Figure 2:
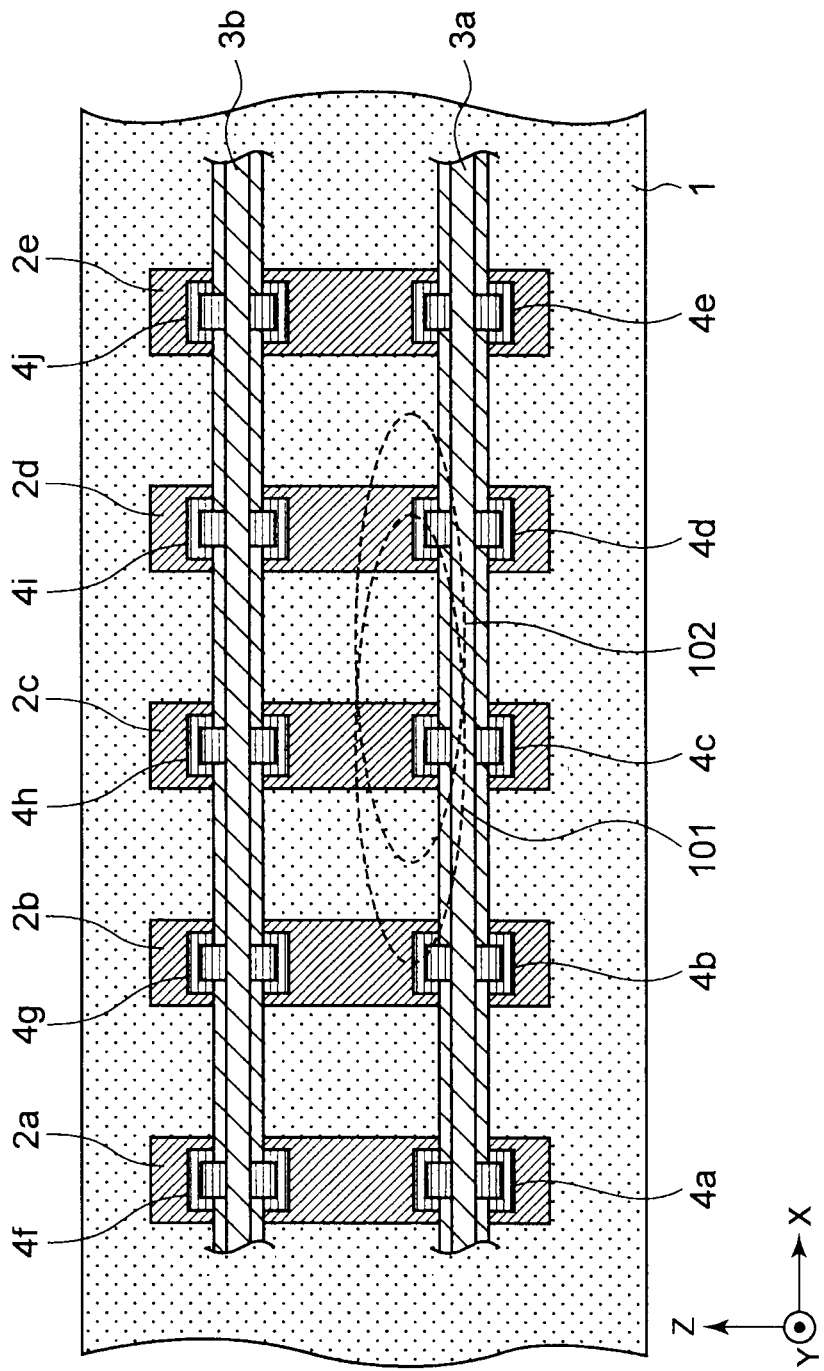
FIG. 2 is a top view of a track, and shows exposed areas 101 and 102 of distance sensors 11a and 11b of FIG. 1.

FIG. 2 is a top view of the track, and shows exposed areas 101 and 102 of the distance sensors 11a and 11b of FIG. 1. Each of the distance sensors 11a and 11b emits a radio wave in a direction which is inclined forward to a traveling direction of the vehicle 10, so that an area covering from a position immediately below the distance sensor to its forward position, in particular, covering multiple ones of the fastening devices 4a to 4e, is exposed to the radio wave. The distance sensor 11a has the exposed area 101, and the distance sensor 11b has the exposed area 102. These exposed areas 101 and 102 overlap each other when the vehicle 10 moves by the distance L between the distance sensors 11a and 11b. When each of the distance sensors 11a and 11b emits a radio wave, strong reflected waves are returned from the fastening devices 4a to 4e each made of metal. If each of the distance sensors 11a and 11b emits a radio wave to a too far position, the fastening devices 4a to 4e are not exposed to the radio wave when the vehicle 10 travels through a curve. Therefore, each of the distance sensors 11a and 11b emits a radio wave to, for example, an area covering from the position immediately below to a position about two meters forward. The distance sensors 11a and 11b are provided on the bottom surface of the vehicle 10 at a position, for example, near the middle between the rails 3a and 3b, rather than a position immediately above the rail 3a (or 3b), so that the fastening devices 4a to 4e are exposed to radio waves from oblique directions (i.e., radio waves propagating with Z-component). This is because if the distance sensors 11a and 11b are provided immediately above the rail 3a or 3b, then reflected waves from the rail 3a or 3b mask reflected waves from other structures, and thus, sufficient surface profile data can not be acquired. Each of the distance sensors 11a and 11b emits a radio wave having a short wavelength sufficient to observe the fastening devices 4a to 4e. In a case where the fastening devices 4a to 4e include bolts having a diameter of about 40 to 50 mm, the wavelength of the radio waves is preferably about 10 to 30 mm. It is assumed that the radio waves emitted from the distance sensors 11a and 11b are polarized orthogonally to a longitudinal direction of the rails 3a and 3b. Thus, it is possible to suppress the reflection from the rails 3a and 3b.

Figure 3:
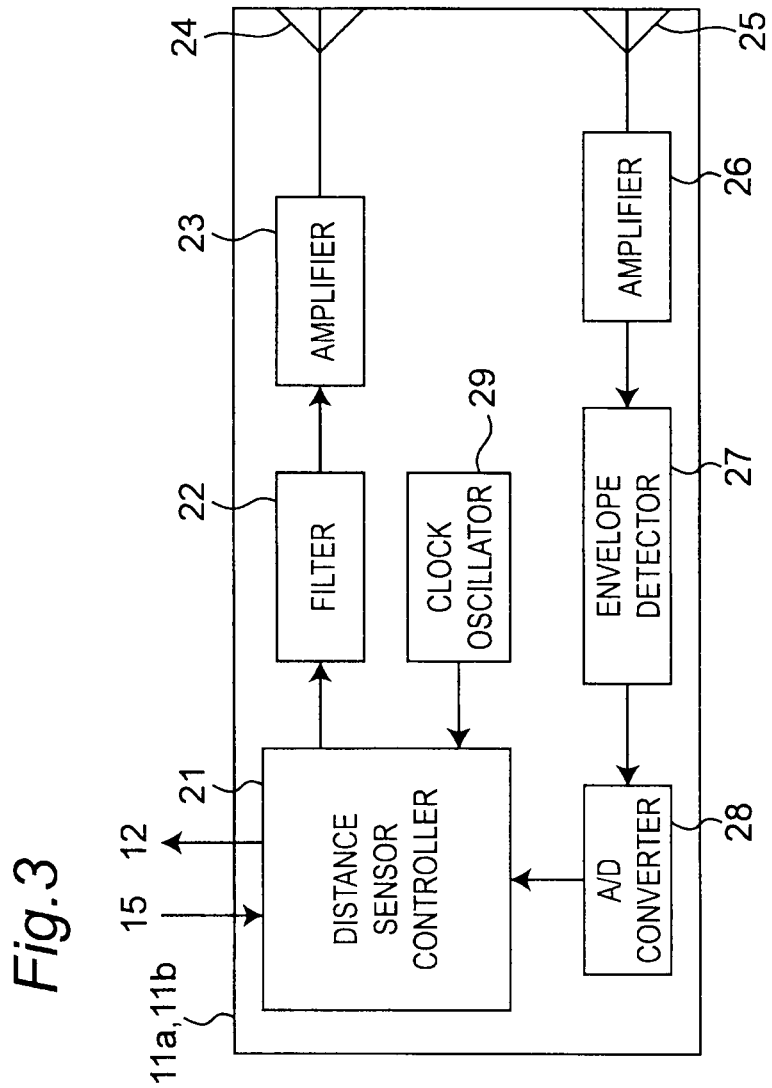
FIG. 3 is a block diagram showing a detailed configuration of each of the distance sensors 11a and 11b of FIG. 1.

FIG. 3 is a block diagram showing a detailed configuration of each of the distance sensors 11a and 11b of FIG. 1. Each of the distance sensors 11a and 11b is provided with: a distance sensor controller 21; a filter 22, an amplifier 23 and a transmitting antenna 24 for emitting a radio wave; a receiving antenna 25, an amplifier 26, an envelope detector 27 and an analog/digital (A/D) converter 28 for receiving a reflected wave; and a clock oscillator 29. The distance sensor controller 21 operates based on a clock signal supplied from the clock oscillator 29. The distance sensor controller 21 may includes a phase lock loop (PLL) circuit (not shown) therein, and multiply a frequency of the supplied clock signal using the PLL circuit to generate a high frequency clock signal for operation. The distance sensor controller 21 measures the ground surface to generate surface profile data each time receiving a measurement pulse from the measurement timing circuit 15, and sends the surface profile data to the memory 12.

Figure 4:
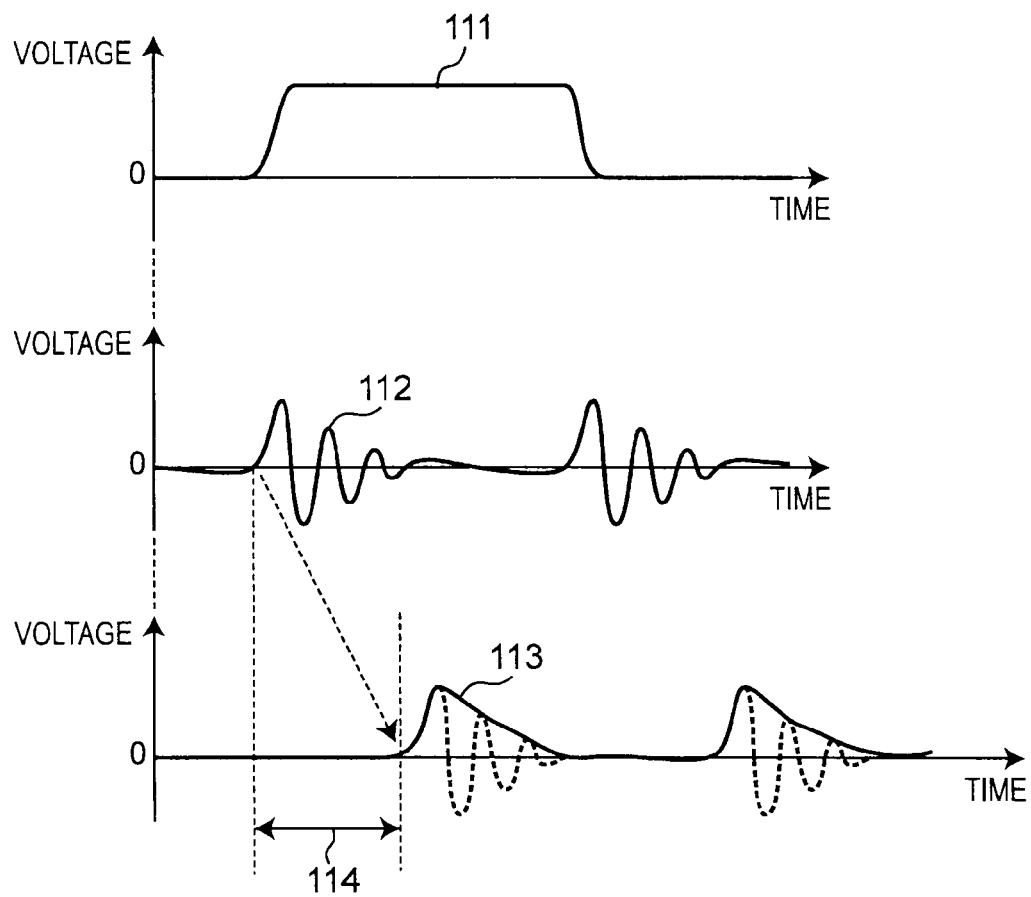
FIG. 4 shows a waveform 111 of a rectangular transmitting signal generated by a distance sensor controller 21 of FIG. 3, a waveform 112 of the transmitting signal after passing through a filter 22 of FIG. 3, and a waveform 113 of a received signal demodulated by an envelope detector 27 of FIG. 3.

When receiving a measurement pulse from the measurement timing circuit 15, the distance sensor controller 21 firstly generates a rectangular transmitting signal based on the clock signal, and sends the generated transmitting signal to the filter 22. The filter 22 extracts harmonic components from the rectangular transmitting signal. The filter 22 is, for example, a Chebyshev type I filter that passes 27 to 29 GHz components. Thus, the filter 22 outputs a pulse wave transmitting signal having a center frequency of 28 GHz. FIG. 4 shows a waveform 111 of a rectangular transmitting signal generated by the distance sensor controller 21, and a waveform 112 of the transmitting signal after passing through the filter 22. As shown in FIG. 4, the pulse waves are generated at a rising edge and a falling edge of the rectangular wave. The pulse wave transmitting signal outputted from the filter 22 is amplified to a predetermined output power by the amplifier 23, and then is emitted from the transmitting antenna 24. The transmitting antenna 24 is a directive antenna for emitting a radio wave to the exposed area 101 or 102 (see FIGS. 1 and 2). The pulse wave radio wave emitted from the transmitting antenna 24 is reflected from the structures on the track, such as the ground 1, the rail ties 2a to 2e, and the fastening devices 4a to 4e, and the reflected waves are received at the receiving antenna 25. The pulse wave received signal received at the receiving antenna 25 is amplified by the amplifier 26, and then is sent to the envelope detector 27. The envelope detector 27 demodulates the pulse wave received signal to generate its envelope signal. FIG. 4 also shows a waveform 113 of the received signal demodulated by the envelope detector 27. The received signal is received after a lapse of a delay time 114 with respect to the transmitting signal, the delay time 114 including a propagation duration from emission of a radio wave to return of a reflected wave. The received signal demodulated by the envelope detector 27 is processed by the A/D converter 28 for A/D conversion, and then is sent to the distance sensor controller 21.

Figure 5:
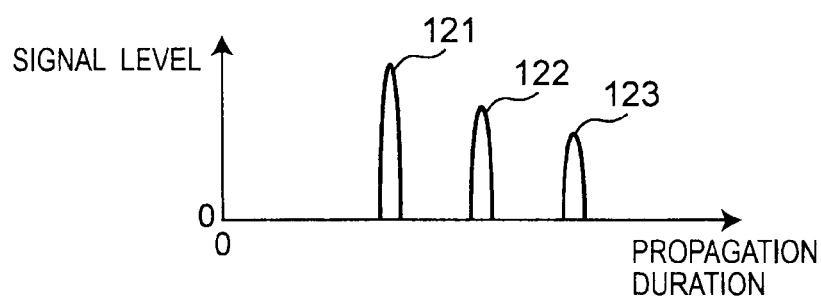
FIG. 5 shows surface profile data obtained by the distance sensor 11a or 11b of FIG. 1.

The distance sensor controller 21 generates surface profile data by measuring signal levels of reflected waves corresponding to a radio wave emitted to the ground surface and then reflected from the various structures on the track, and measuring propagation durations from the emission of the radio wave to the return of the respective reflected waves. In consideration of different propagation durations depending on different distances from the distance sensor 11a or 11b to the structures on the track, the distance sensor controller 21 continues to take in the received signal for a predetermined time so as to receive both the reflected waves from the nearest structure and the farthest structure in the exposed area 101 or 102 of the radio wave. As described above, in the case of emitting a radio wave to the exposed area covering from the position immediately below the distance sensor 11a or 11b to the position two meters forward, a duration for taking in the received signal is set to be about twice as long as the time required from the emission of the radio wave to the return of the reflected wave from the structure two meters forward. the time for transferring signals in internal circuits of the distance sensor 11a or 11b is measured in advance, and the distance sensor controller 21 can take only a radio wave propagation duration into consideration when generating surface profile data. FIG. 5 shows surface profile data obtained by the distance sensor 11a or 11b of FIG. 1. A peak of a reflected wave occurs corresponding to the structure on the track which causes strong reflection (e.g., the fastening devices 4a to 4e). For example, a peak 121 is of a reflected wave from the fastening device 4c, a peak 122 is of a reflected wave from the fastening device 4d, and a peak 123 is of a reflected wave from the fastening device 4e. A distance from each of the distance sensors 11a and 11b to a structure on the track is obtained from a relation "propagation duration*light speed/2". According to the first to seventh preferred embodiments of the present invention, a radio wave propagation duration is employed instead of a distance from each of the distance sensors 11a and 11b to a structure on the track. Finally, the distance sensor controller 21 sends generated surface profile data to the memory 12. Each of the distance sensors 11a and 11b repeats the process described above each time receiving a measurement pulse from the measurement timing circuit 15.

The distance sensor controller 21 may be configured, for example, using an FPGA.

Figure 6:
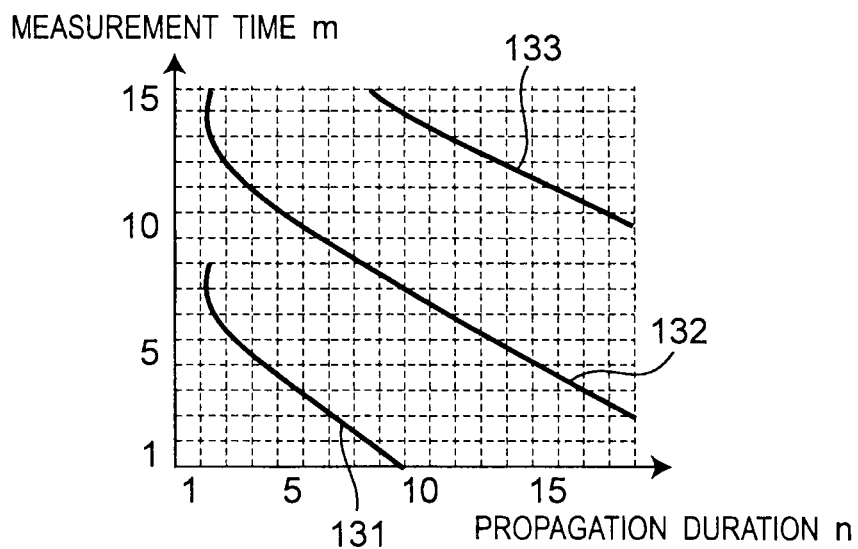
FIG. 6 shows a two dimensional array of the surface profile data measured by the distance sensor 11a of FIG. 1 and stored in a memory 12 of FIG. 1.
Figure 7:
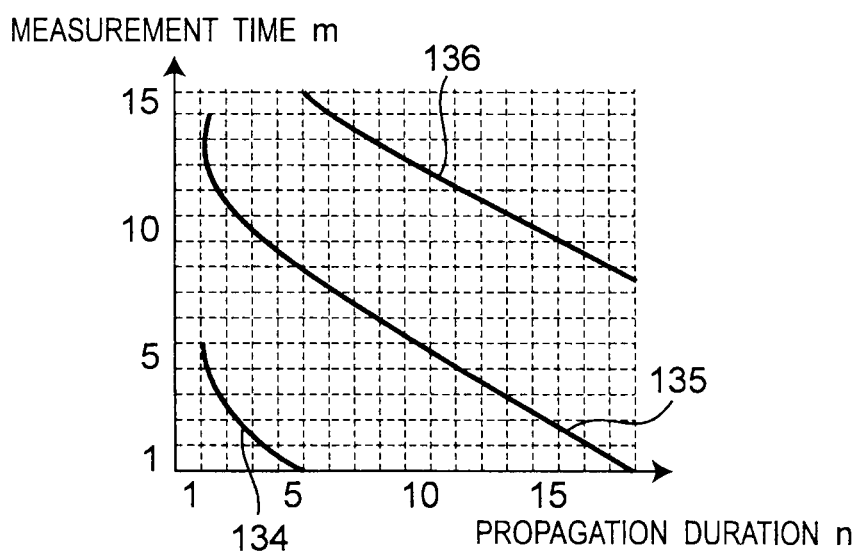
FIG. 7 shows a two dimensional array of the surface profile data measured by the distance sensor 11b of FIG. 1 and stored in the memory 12 of FIG. 1.

FIG. 6 shows a two dimensional array of the surface profile data measured by the distance sensor 11a of FIG. 1 and stored in the memory 12 of FIG. 1. FIG. 7 shows a two dimensional array of the surface profile data measured by the distance sensor 11b of FIG. 1 and stored in the memory 12 of FIG. 1. The memory 12 stores the surface profile data generated by the distance sensor 11a and the surface profile data generated by the distance sensor 11b, separately. The surface profile data is generated for each measurement pulse from the measurement timing circuit 15. Each time the surface profile data is generated, the memory 12 accumulates the surface profile data and stores the accumulated surface profile data as a two dimensional array of the surface profile data. The memory 12 stores different surface profile data as data at different measurement times (i.e., measurement time instants) each represented by a discrete variable "m". Each row of the two dimensional array data corresponds to the stored surface profile data. Referring to FIGS. 6 and 7, the first surface profile data (the oldest surface profile data) is stored on the bottom row. Each time surface profile data is generated, the generated surface profile data is stored on a row immediately above the row on which the preceding surface profile data is stored. With regard to the surface profile data on each row of the two dimensional array data, the propagation duration is represented by a discrete variable "n". Referring to FIGS. 6 and 7, the propagation duration from the emission of the radio wave to the return of the reflected wave (i.e., the distance from the distance sensor 11a or 11b to the structure on the track) increases from left to right of the array. The surface profile data contain elements (each specified with the propagation duration n) corresponding to signal levels of reflected waves. Referring to FIG. 6, lines shown with reference numbers 131 to 133 indicate reflected waves from, e.g., the fastening devices 4c to 4e, and correspond to the peaks 121 to 123 of the reflected waves in FIG. 5, respectively. The two dimensional array data of FIG. 6 shows the variations over time in the peaks 121 to 123 of the reflected waves. Referring to leftmost parts of the lines indicating the reflected wave peaks 131 and 132, the shorter the propagation duration is, the steeper the line's gradient is. This is because variation over time in the distance from the distance sensor 11a or 11b to the structure on the track is reduced. The distance sensors 11a and 11b are separated by the distance L from each other. Therefore, the surface profile data generated by the distance sensor 11a has a delay corresponding to the time for which the vehicle 10 travels by the distance L, as compared with the surface profile data generated by the distance sensor 11b. Referring to FIG. 7, lines shown with reference numbers 134 to 136 indicate the reflected waves from the fastening devices 4c to 4e, respectively, in a manner similar to that of the two dimensional array data of FIG. 6. Although the line indicating the reflected wave peak 131 of FIG. 6 and the line indicating the reflected wave peak 134 of FIG. 7 indicate the reflected waves from the same fastening device 4c, the former line has a delay on the measurement time as compared with the latter line. The same things hold true for the lines indicating the reflected wave peaks 132 and 133 of FIG. 6 and the lines indicating the reflected wave peaks 135 and 136 of FIG. 7. The delay on the measurement time corresponds to the time for which the vehicle 10 travels by the distance L.

Figure 8:
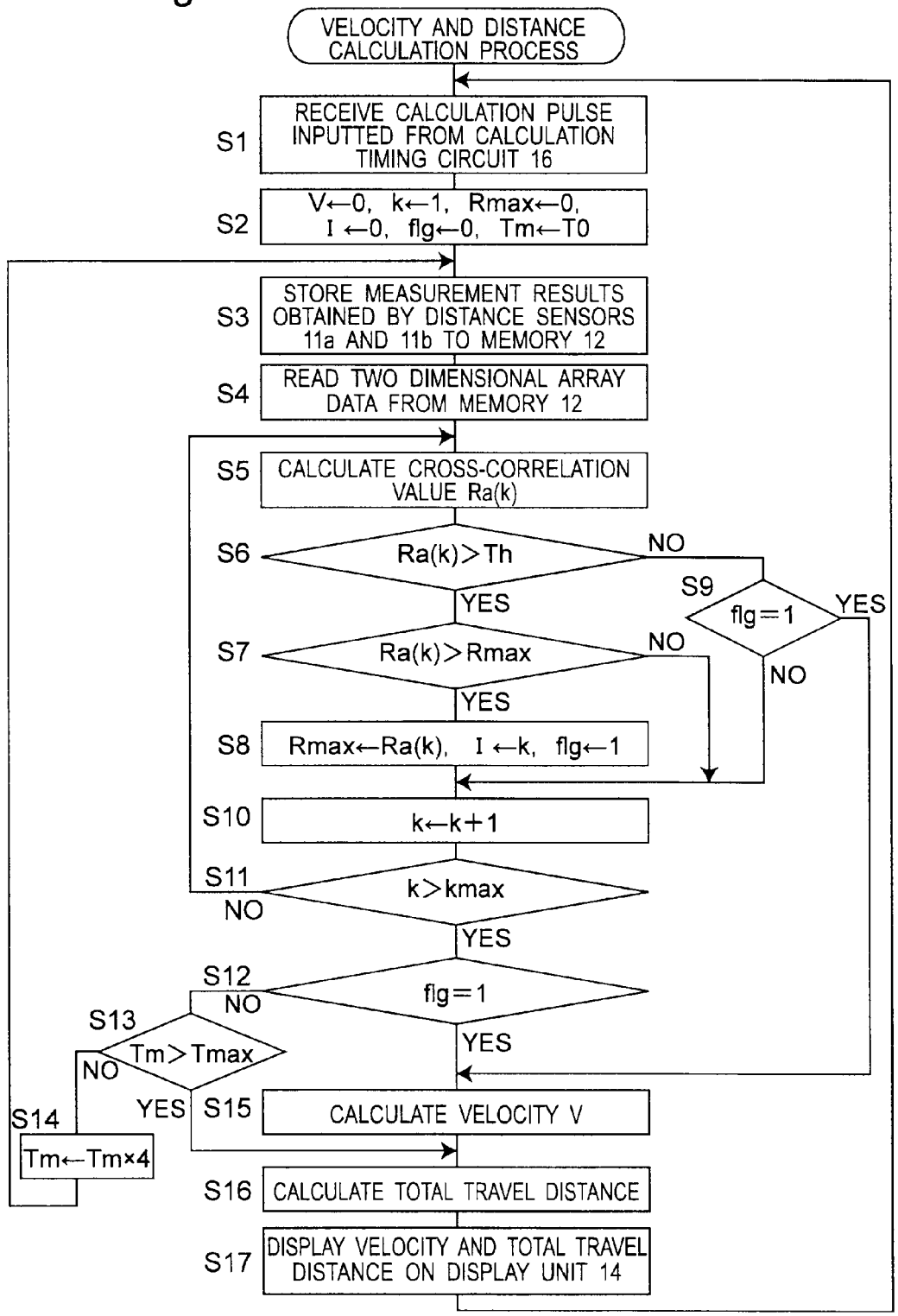
FIG. 8 is a flowchart showing a velocity and distance calculation process executed by a calculation unit 13 of FIG. 1.

FIG. 8 is a flowchart showing a velocity and distance calculation process executed by the calculation unit 13 of FIG. 1.

In step S1, the calculation unit 13 receives a calculation pulse inputted from the calculation timing circuit 16. Each time a calculation pulse is inputted (the cycle inputted is denoted by "Tc"), the calculation unit 13 calculates a velocity of the vehicle 10 and a travel distance since the input of the calculation pulse, from the two dimensional array data stored in the memory 12. The calculation unit 13 also calculates a total travel distance from the calculated travel distance. For these calculations, the calculation unit 13 calculates a cross-correlation value between the two dimensional array data of the distance sensor 11a and the two dimensional array data of the distance sensor 11b. In step S2, the calculation unit 13 initializes various variables; a velocity "V" is set to 0, a time difference "k" for calculating the cross-correlation value is set to 1, the current maximum "Rmax" among cross-correlation values is set to 0, a detected time difference "I" is set to 0, a flag "flg" indicating whether or not a peak of the cross-correlation value is detected is set to 0, and a measurement cycle "Tm" corresponding to a degree of compression over time of surface profile data stored in the memory 12 is set to a predetermined initial value "T0". The initial value of the measurement cycle T0 is equal to the cycle of the measurement pulse from the measurement timing circuit 15. According to the process of FIG. 8, the time difference k for calculating the cross-correlation value is changed from 0 to a predetermined maximum "kmax", a first peak of the cross-correlation value is detected, and a velocity and a total travel distance of the vehicle 10 is calculated from the value of the time difference k when detecting the first peak.

In step S3, the calculation unit 13 stores the surface profile data measured by the distance sensors 11a and 11b, in the memory 12. After the surface profile data are stored in the memory 12 for the sufficiently long measurement time, then in step S4, the calculation unit 13 reads the two dimensional array of the surface profile data from the memory 12. After the two dimensional array of the surface profile data is outputted from the memory 12 to the calculation unit 13, the calculation unit 13 deletes an older half of the stored surface profile data, and restarts accumulation of new surface profile data. In step S5, the calculation unit 13 calculates a cross-correlation value Ra(k) using on the following equation.

$$Ra(k) = \sum_{m=1}^{M} \sum_{n=1}^{N} A(m+k, n) B(m, n) \qquad \text{Equation 1}$$

A(m+k, n) represents an element of the two dimensional array data of the distance sensor 11a, the element is located within surface profile data at a measurement time m+k, having a propagation duration n. Likewise, B(m,n) represents an element of the two dimensional array data of the distance sensor 11b, the element is located within surface profile data at a measurement time m, having a propagation duration n. The time difference k for calculating the cross-correlation value indicates a time required for the vehicle 10 to travel by the distance L.

Figure 9:
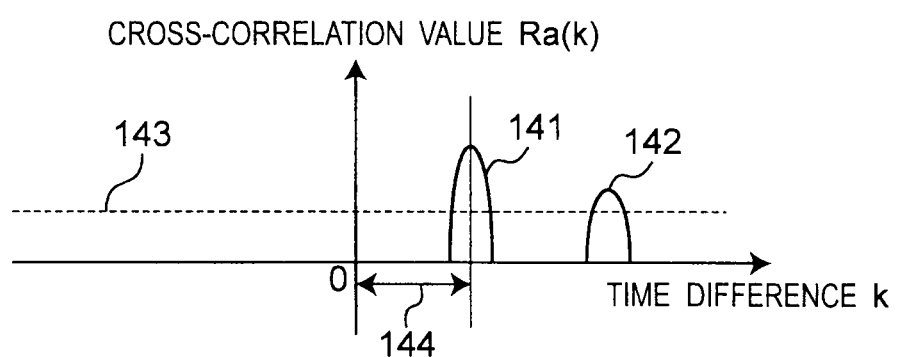
FIG. 9 is a schematic diagram for illustrating cross-correlation values Ra(k) calculated in steps S5 to S11 of FIG. 8.

FIG. 9 is a schematic diagram for illustrating cross-correlation values Ra(k) calculated in steps S5 to S11 of FIG. 8. Peaks 141 and 142 of cross-correlation values are obtained by calculating the cross-correlation values using Equation 1 while changing the time difference k. In steps S5 to S11, the first peak 141 of the cross-correlation value which exceeds the a predetermined threshold value 143 is detected, and a time difference 144 of a maximum of the first peak 141 is determined as a time difference I for calculating a velocity V.

In step S6, the calculation unit 13 determines whether or not the cross-correlation value Ra(k) is larger than a predetermined threshold value "Th" (corresponding to the threshold value 143 of FIG. 9). If YES, the process proceeds to step S7; if NO, the process proceeds to step S9. In step S7, the calculation unit 13 determines whether or not the cross-correlation value Ra(k) is larger than the current maximum Rmax among the cross-correlation values. If YES, the process proceeds to step S8; if NO, the process proceeds to step S10. In step S8, the calculation unit 13 updates the various variables; the current maximum Rmax among the cross-correlation values is updated with a current cross-correlation value Ra(k), the detected time difference I is updated with a current time difference k, and the flag flg is set to 1 to indicate the detection of the peak of the cross-correlation value Ra(k). In step S9, the calculation unit 13 determines whether or not the flag flg is 1. If YES, the process proceeds to step S15; if NO, the process proceeds to step S10. Step S9 is YES if the cross-correlation value Ra(k) becomes equal to or less than the threshold value Th after detecting the peak of the cross-correlation value Ra(k). In step S10, the calculation unit 13 increments the time difference k by 1. In step S11, the calculation unit 13 determines whether or not the time difference k is larger than the predetermined maximum kmax. If YES, the process proceeds to step S12; if NO, the process returns to step S5. In step S12, the calculation unit 13 determines whether or not the flag flg is 1. If YES, the process proceeds to step S15; if NO, the process proceeds to step S13.

Figure 10:
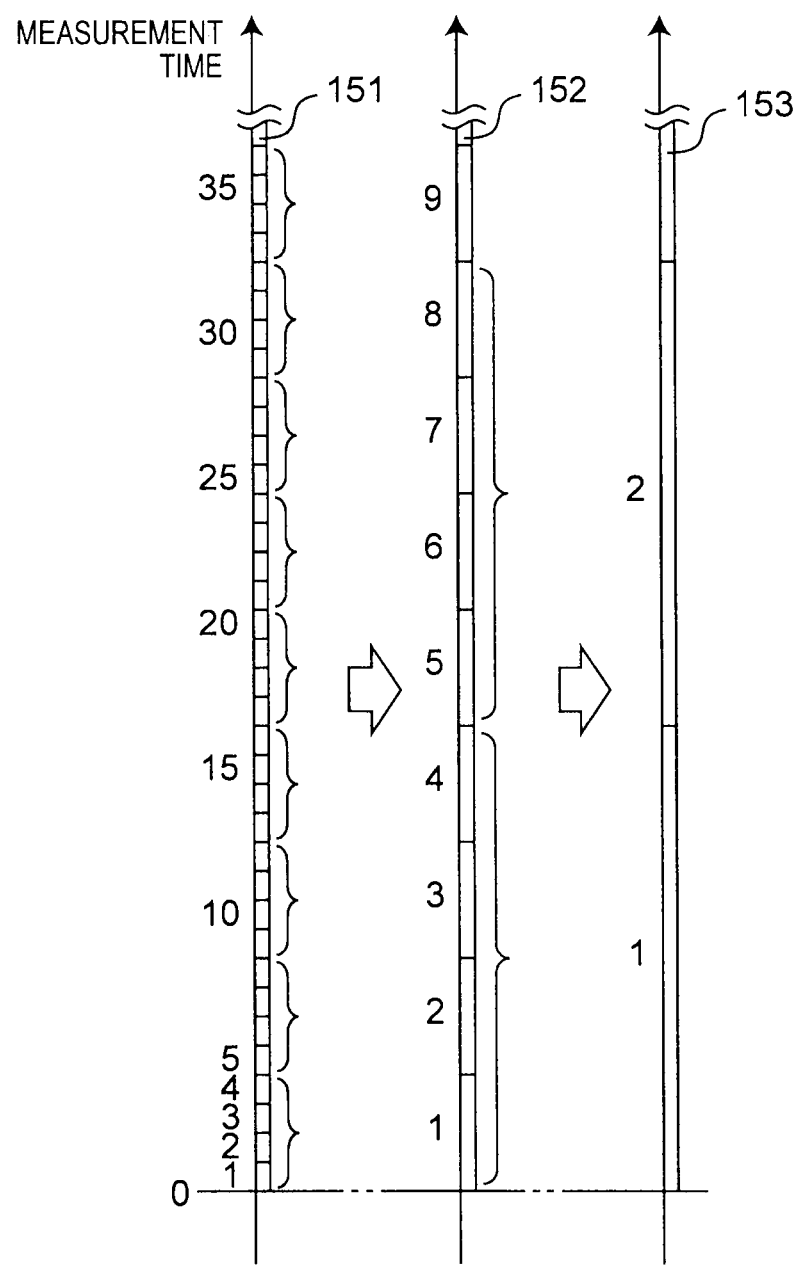
FIG. 10 is a schematic diagram for illustrating decimation processes by increasing a measurement cycle Tm in step S14 of FIG. 8.

Step S12 is NO if any peak of the cross-correlation value Ra(k) is not detected even when changing the time difference k. Since this may be because the velocity of the vehicle 10 is lower than a measurement limit, the calculation unit 13 increases the measurement cycle Tm and acquires surface profile data for a longer period of time on trial. In step S13, the calculation unit 13 firstly determines whether or not the measurement cycle Tm is larger than a predetermined maximum "Tmax". If YES, the process proceeds to step S16; if NO, the process proceeds to step S14. In step S14, the calculation unit 13 multiplies the measurement cycle Tm by a predetermined factor (e.g., 4). After step S14, the process returns to step S3, and then, the calculation unit 13 executes a decimation process of surface profile data in accordance with a new measurement cycle Tm, when storing the surface profile data measured by the distance sensors 11a and 11b in the memory 12. FIG. 10 is a schematic diagram for illustrating decimation processes by increasing the measurement cycle Tm in step S14 of FIG. 8. A reference number 151 denotes the progression of measurement times in a case of the measurement cycle Tm=T0. A reference number 152 denotes the progression of measurement times in a case of the measurement cycle Tm=T0*4. A reference number 153 denotes the progression of measurement times in a case of the measurement cycle Tm=T0*16. In the case of the measurement cycle Tm=T0, the original surface profile data generated by the distance sensors 11a and 11b are stored in the memory 12. In the case of increasing the measurement cycle Tm, for example, in the case of multiplying the measurement cycle Tm by four, the calculation unit 13 temporarily reads the surface profile data for the four measurement times m, m+1, m+2 and m+3 from the memory 12, executes the decimation process to select the maximum among the four signal levels for each propagation duration n, and again, stores the surface profile data subjected to the decimation process in the memory 12. Hence, the storage space in the memory 12 for the measurement cycle Tm=T0*4 can be reduced to ¼ as compared with the case of the measurement cycle Tm=T0, and the storage space in the memory 12 for the measurement cycle Tm=T0*16 can be reduced to 1/16 as compared with the case of the measurement cycle Tm=T0. Thus, it is possible to accumulate surface profile data for a longer period of time in the memory 12. Even when the peak of the cross-correlation value Ra(k) is not detected due to a low velocity of the vehicle 10, it is possible to increase the measurement cycle Tm, and calculate the cross-correlation value Ra(k) from the surface profile data for the longer period of time, thus reliably detecting the peak of the cross-correlation value Ra(k).

In step S15, the calculation unit 13 calculates a velocity V of the vehicle 10 from the detected time difference I using the following equation.

$$V = L \div (I \times Tm) \qquad \text{Equation 2}$$

On the other hand, step S13 is YES if any peak of the cross-correlation value Ra(k) is not detected even when increasing the measurement cycle Tm. In this case, the calculation unit 13 determines that the vehicle 10 is really stopping, and the velocity V is not changed from the value of 0 that is initialized in step S2.

In step S16, the calculation unit 13 calculates a travel distance V*Tc since the input of the calculation pulse, and sums the calculated travel distance to calculate a total travel distance from a start point (i.e., a position of the vehicle 10 at the time when a start point pulse is inputted from the controller 17). In step S17, the calculation unit 13 displays the velocity V and the total travel distance on the display unit 14. Then, the process returns to step S1.

According to the first preferred embodiment, the pulse wave transmitting signal is used to obtain the propagation duration from the emission of the radio wave to the return of the reflected wave from the structure on the track. Alternatively, it is possible to use any one of other schemes capable of measuring a distance, such as FM-CW, spread spectral, or chirped pulse scheme.

According to the first preferred embodiment of the present invention as described above, the velocity measurement apparatus emits radio waves to the structures on the track with large variations in the surface profile, such as the ground 1, the rail ties 2a to 2e, and the fastening devices 4a to 4j, from oblique directions, acquires surface profile data including signal levels of reflected waves reflected from these structures, and including propagation durations from the emission of the radio waves to the return of the respective reflected waves, and calculates a velocity of the vehicle 10 using the obtained data as a whole. Hence, according to the first preferred embodiment of the present invention, it is possible to calculate a velocity of the vehicle 10 with a small error, and calculate a total travel distance of the vehicle 10 with a small error.

In addition, according to the first preferred embodiment of the present invention, the velocity measurement apparatus emits radio waves polarized orthogonally to the longitudinal direction of the rails 3a and 3b, thus avoiding strong reflection from the rails 3a and 3b. Accordingly, it is possible to reliably obtain a propagation duration from emission of a radio wave to return of a reflected wave (i.e., a distance from each of the distance sensors 11a and 11b to a structure on the track), and to calculate a velocity of the vehicle 10 with a small error.

In addition, according to the first preferred embodiment of the present invention, the velocity measurement apparatus uses radio waves having a wavelength of 10 to 30 mm so that the radio waves strongly reflect from the fastening devices 4a to 4j. Accordingly, it is possible to reliably obtain a propagation duration from emission of a radio wave to return of a reflected wave, and to calculate a velocity of the vehicle 10 with a small error.

Further, according to the first preferred embodiment of the present invention, the velocity measurement apparatus compresses surface profile data over time for calculation using the surface profile data for a longer period of time. Therefore, it is possible to reliably measure a velocity of the vehicle 10 even under a low velocity.

According to the prior art, a Doppler frequency is often employed for measuring a velocity of the vehicle 10. However, essentially, in a case where a radio wave from a Doppler velocity meter is emitted to the ground 1 from an oblique direction, a reflected wave from a position far from the Doppler velocity meter have a different Doppler frequency from that of a reflected wave from a position near to the Doppler velocity meter, and therefore, the reflected wave is a Doppler signal including a combination of a plurality of frequency components. Such a Doppler signal has a considerably complex waveform, and there is a problem that that calculation of a velocity from the Doppler signal results in a large error. According to the first preferred embodiment of the present invention, a Doppler frequency is not employed at all, surface profile data is acquired by emitting a pulse wave radio wave, and a velocity of the vehicle 10 is calculated from a time difference between surface profile data acquired by the plurality of distance sensors 11a and 11b. Therefore, it is possible to calculate a velocity of the vehicle 10 with a small error, and calculate a total travel distance of the vehicle 10 with a small error.

Second Preferred Embodiment

Figure 11:
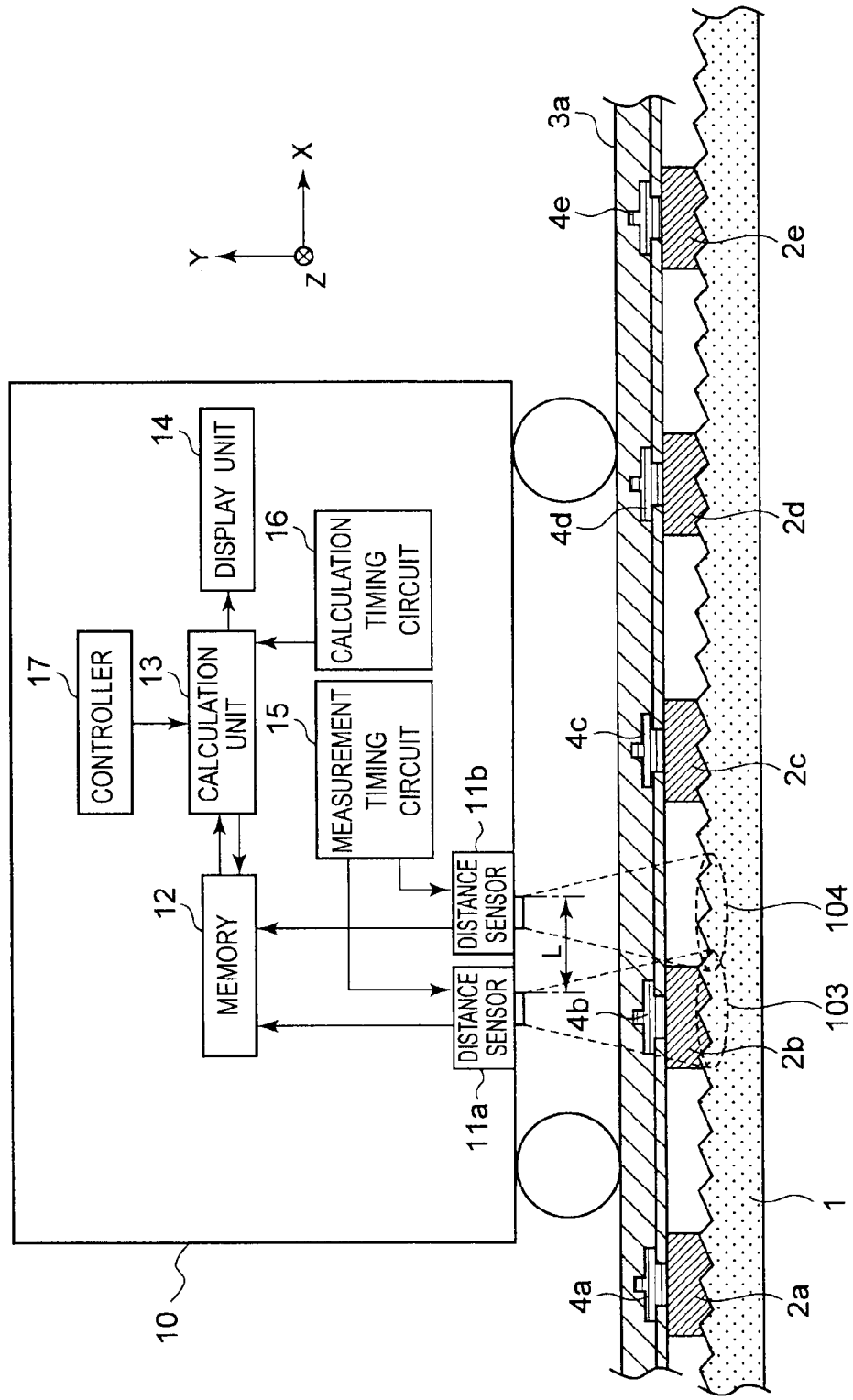
FIG. 11 is a schematic diagram showing a configuration of a vehicle 10 equipped with a velocity measurement apparatus according to a second preferred embodiment of the present invention.

FIG. 11 is a schematic diagram showing a configuration of a vehicle 10 equipped with a velocity measurement apparatus according to a second preferred embodiment of the present invention. According to the first preferred embodiment, each of the distance sensors 11a and 11b emits a radio wave in a direction which is inclined forward to a traveling direction of the vehicle 10, and receives reflected waves from various structures on the track, having different distances to the distance sensor. On the other hand, the second preferred embodiment is characterized in that each of distance sensors 11a and 11b emits a radio wave to a position immediately below, and receives a plurality of reflected waves reflected different times between the vehicle 10 and a track.

The distance sensors 11a and 11b of FIG. 11 are configured in a manner similar to that of the distance sensors 11a and 11b in the first preferred embodiment, except that each of the distance sensors 11a and 11b of FIG. 11 emits a radio wave to the position immediately below. The distance sensor 11a has an exposed area 103, and the distance sensor 11b has an exposed area 104. These exposed areas 103 and 104 overlap each other when the vehicle 10 moves by a distance L between the distance sensors 11a and 11b. Preferably, the exposed areas 103 and 104 of the distance sensors 11a and 11b are respectively set to cover fastening devices 4a to 4e. More preferably, the exposed areas 103 and 104 are set to not cover rails 3a and 3b so as to prevent that reflected waves from the rails 3a and 3b mask reflected waves from other structures. Each of the exposed areas 103 and 104 spans about a width of rail ties 2a to 2e in an X axis direction. Preferably, a height of the distance sensors 11a and 11b from the ground 1 is set to about 40 to 60 cm, and a height of the distance sensors 11a and 11b from the rails 3a and 3b is set to about 20 to 40 cm.

Figure 12:
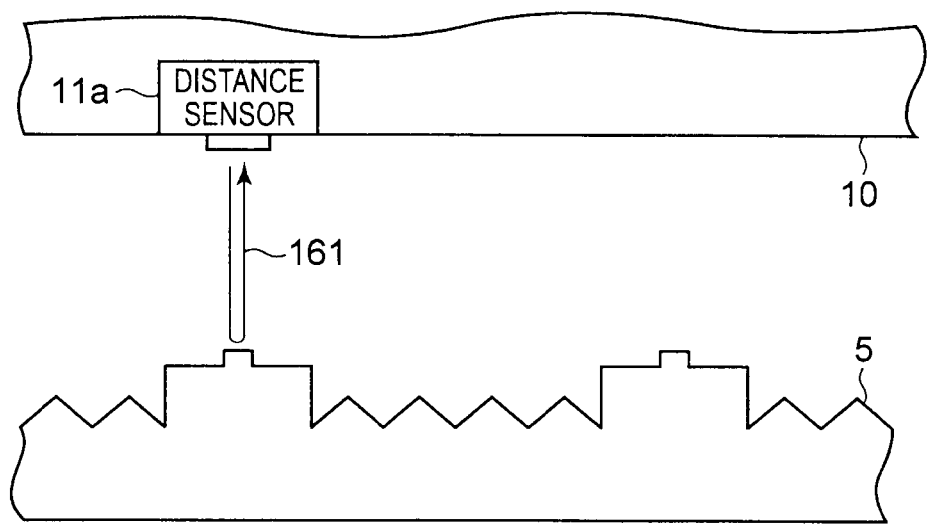
FIG. 12 shows a radio wave propagation path between a distance sensor 11a and a ground surface 5 in a case where the vehicle 10 is in a first position, and particularly, shows a propagation path 161 of a radio wave reflected once.
Figure 13:
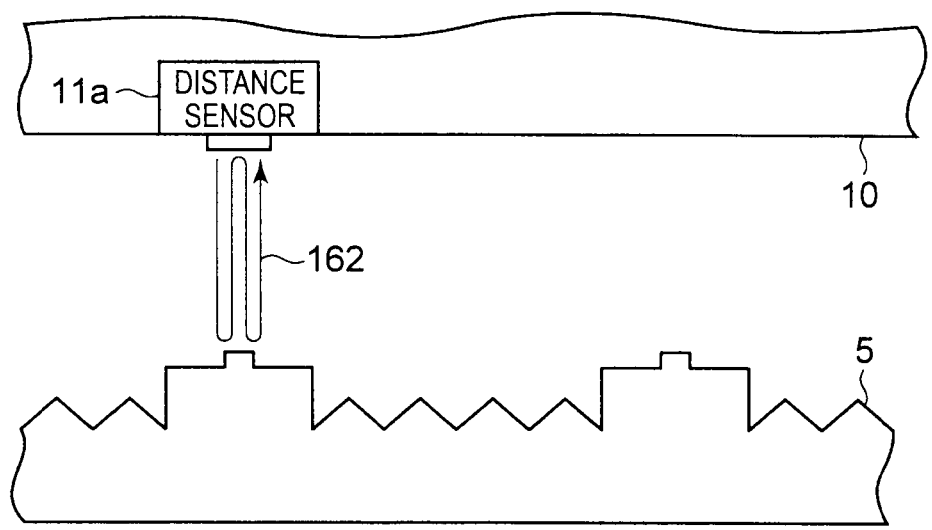
FIG. 13 shows a radio wave propagation path between the distance sensor 11a and the ground surface 5 in the case where the vehicle 10 is in the first position, and particularly, shows a propagation path 162 of a radio wave reflected three times.
Figure 14:
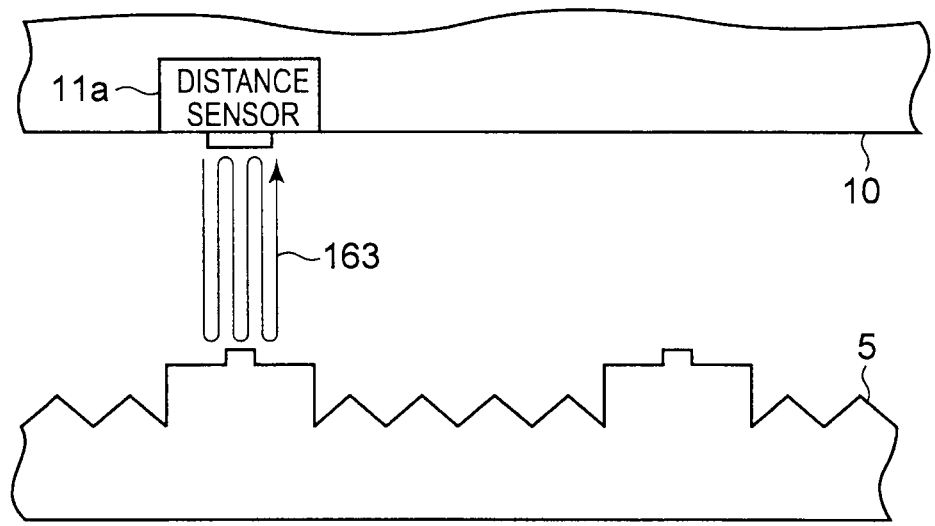
FIG. 14 shows a radio wave propagation path between the distance sensor 11a and the ground surface 5 in the case where the vehicle 10 is in the first position, and particularly, shows a propagation path 163 of a radio wave reflected five times.
Figure 15:
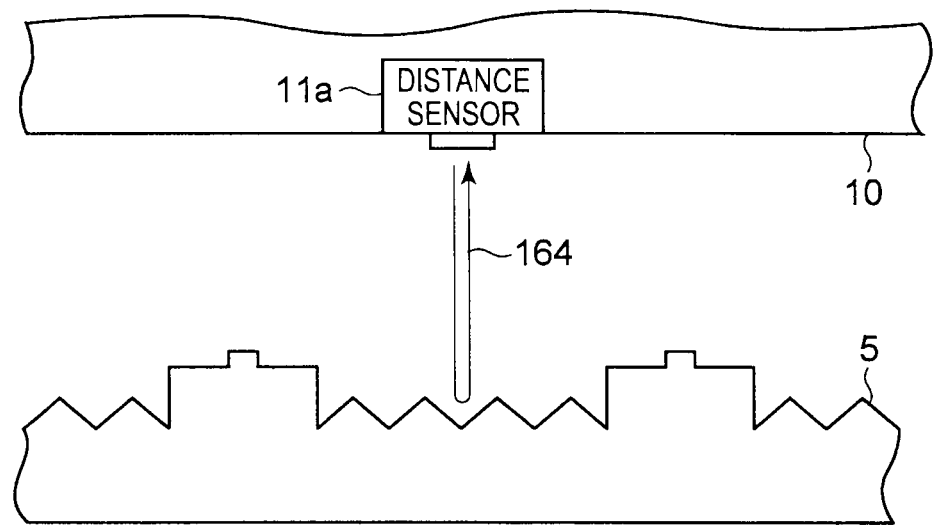
FIG. 15 shows a radio wave propagation path between the distance sensor 11a and the ground surface 5 in a case where the vehicle 10 is in a second position, and particularly, shows a propagation path 164 of a radio wave reflected once.
Figure 16:
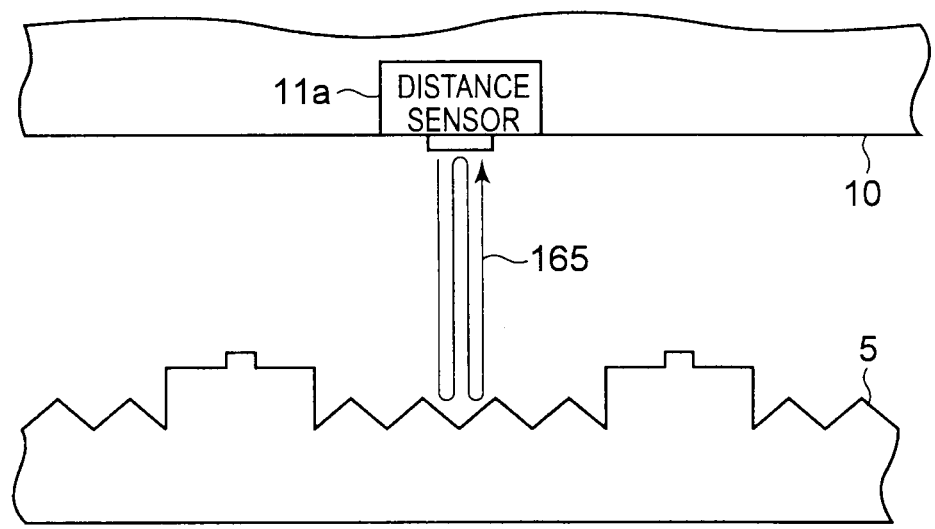
FIG. 16 shows a radio wave propagation path between the distance sensor 11a and the ground surface 5 in the case where the vehicle 10 is in the second position, and particularly, shows a propagation path 165 of a radio wave reflected three times.
Figure 17:
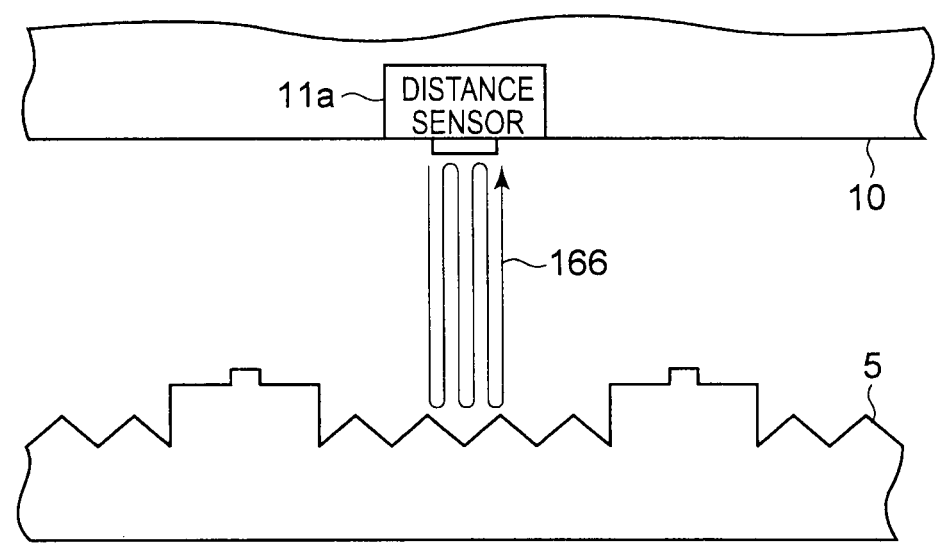
FIG. 17 shows a radio wave propagation path between the distance sensor 11a and the ground surface 5 in the case where the vehicle 10 is in the second position, and particularly, shows a propagation path 166 of a radio wave reflected five times.

FIGS. 12 to 14 show radio wave propagation paths between the distance sensor 11a and a ground surface 5 in a case where the vehicle 10 is in a first position. FIG. 12 shows a propagation path 161 of a radio wave reflected once. FIG. 13 shows a propagation path 162 of a radio wave reflected three times. FIG. 14 shows a propagation path 163 of a radio wave reflected five times. FIGS. 15 to 17 show radio wave propagation paths between the distance sensor 11a and the ground surface 5 in a case where the vehicle 10 is in a second position different from the first position. FIG. 15 shows a propagation path 164 of a radio wave reflected once. FIG. 16 shows a propagation path 165 of a radio wave reflected three times. FIG. 17 shows a propagation path 166 of a radio wave reflected five times. For ease of illustration, the ground 1, the rail ties 2a to 2e, and the fastening devices 4a to 4e are collectively shown as the ground surface 5. The distance sensor 11a emits a radio wave each time receiving a measurement pulse from a measurement timing circuit 15. Then, the distance sensor 11a receives a reflected wave reflected once by the ground surface 5, a reflected wave reflected three times between the ground surface 5 and the vehicle 10, and a reflected wave reflected five times between the ground surface 5 and the vehicle 10. Then, the distance sensor 11a generates surface profile data from these reflected waves. The distance sensor 11b also operates in a manner similar to that of the distance sensor 11a as shown in FIGS. 12 to 17.

Figure 18:
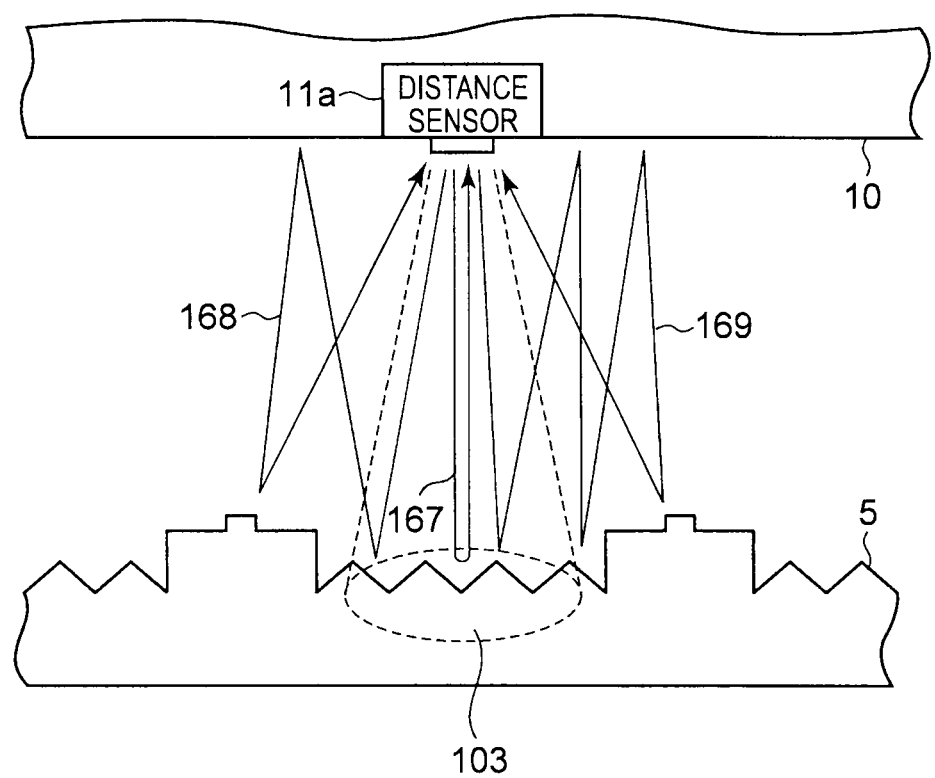

FIG. 18 shows propagation paths 167 to 169 in a case of receiving radio waves reflected outside the exposed area 103 of the sensor 11a. Each of the distance sensors 11a and 11b may be configured to use multipath reflected waves for generating surface profile data, i.e., to receive the reflected waves from a structure on the track, which is outside the exposed areas 103 and 104 of the distance sensors 11a and 11b. Referring to FIG. 18, the propagation path 168 of the radio wave reflected three times and the propagation path 169 of the radio wave reflected three times include reflections outside the exposed area 103 of the distance sensor 11a. The distance sensor 11b may also be configured in a manner similar to that of the distance sensor 11a as shown in FIG. 18.

According to the second preferred embodiment as described above, each of the distance sensors 11a and 11b emits a radio wave to the position immediately below, and receives reflected waves reflected up to five times between the vehicle 10 and the ground surface 5.

Figure 19:
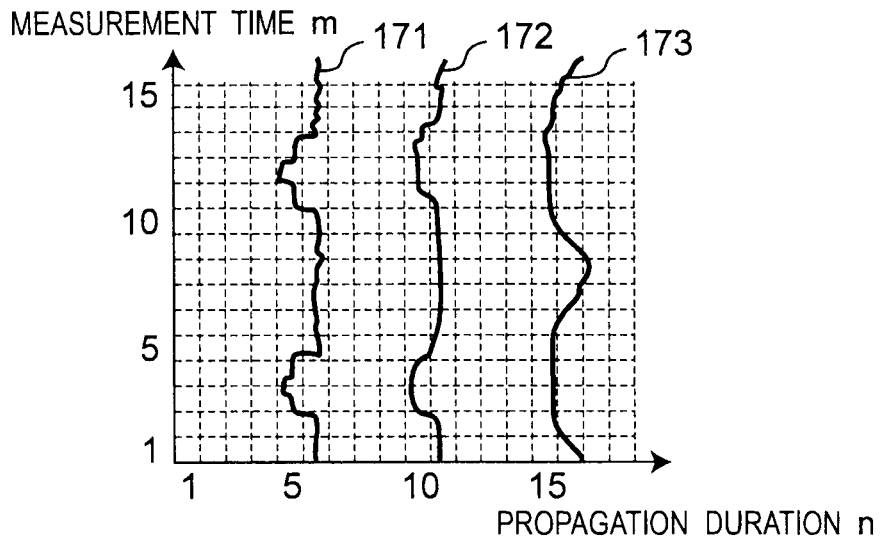
FIG. 19 shows a two dimensional array of the surface profile data measured by the distance sensor 11a of FIG. 11 and stored in a memory 12 of FIG. 11.
Figure 20:
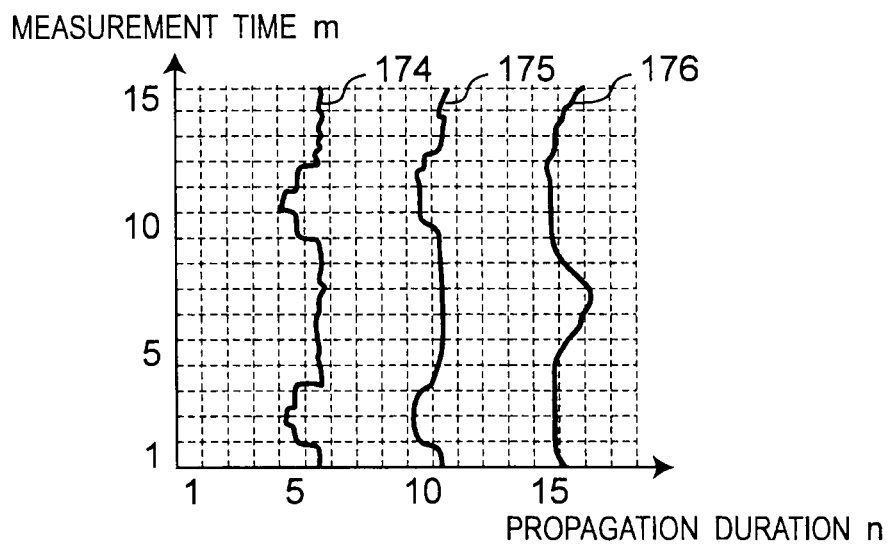
FIG. 20 shows a two dimensional array of the surface profile data measured by a distance sensor 11b of FIG. 11 and stored in the memory 12 of FIG. 11.

FIG. 19 shows a two dimensional array of the surface profile data measured by the distance sensor 11a of FIG. 11 and stored in a memory 12 of FIG. 11. FIG. 20 shows a two dimensional array of the surface profile data measured by the distance sensor 11b of FIG. 11 and stored in the memory 12 of FIG. 11. Surface profile data generated by the distance sensor 11a and surface profile data generated by the distance sensor 11b are stored in the memory 12 in a manner similar to that of the first preferred embodiment. In FIGS. 19 and 20, lines shown with reference numbers 171 and 174 indicate peaks of the reflected waves reflected once, lines shown with reference numbers 172 and 175 indicate peaks of the reflected waves reflected three times, and lines shown with reference numbers 173 and 176 indicate peaks of the reflected waves reflected five times. The reflected waves reflected three times and the reflected waves reflected five times include multiple reflections at various angles, and therefore, have a plurality of peaks rather than a single peak. For ease of illustration, each of FIGS. 19 and 20 shows one peak. The distance sensors 11a and 11b are separated by a distance L from each other. Therefore, the surface profile data generated by the distance sensor 11a has a delay corresponding to a time for which the vehicle 10 travels by the distance L, as compared with the surface profile data generated by the distance sensor 11b.

A calculation unit 13 executes the velocity and distance calculation process shown in FIG. 8 based on the two dimensional array data shown in FIGS. 19 and 20, to calculate a velocity and a total travel distance of the vehicle 10.

According to the second preferred embodiment of the present invention as described above, the velocity measurement apparatus uses multipath reflected waves i.e., receive the reflected waves from a structure on the track, which is outside the exposed areas 103 and 104 of the distance sensors 11a and 11b, for generating surface profile data. Therefore, it is possible to reliably measure a velocity of the vehicle 10 even when the positions immediately below the distance sensors 11a and 11b are smooth surfaces. In a case where a large number of apparatuses are attached to a bottom surface of the vehicle 10 and the velocity measurement apparatus can not emit a radio wave in a direction which is inclined forward to a traveling direction of the vehicle 10 as shown in FIG. 1, radio waves are emitted to the positions immediately below the distance sensors 11a and 11b in accordance with the second preferred embodiment. Thus, it is possible to measure a velocity of the vehicle 10 with a small error by emitting radio waves to the positions immediately below the distance sensors 11a and 11b and receiving a plurality of reflected waves reflected multiple times.

Third Preferred Embodiment

Figure 21:
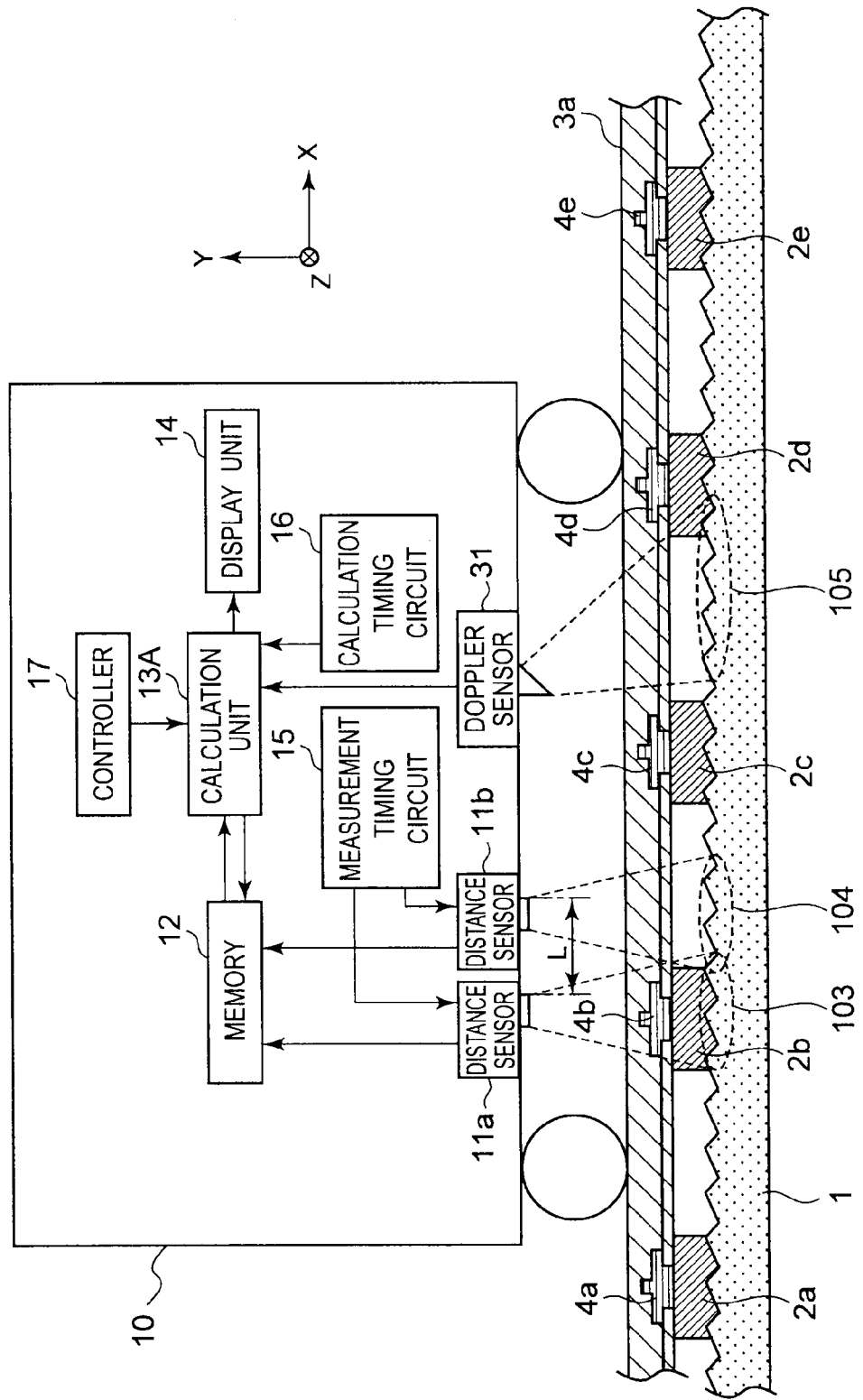
FIG. 21 is a schematic diagram showing a configuration of a vehicle 10 equipped with a velocity measurement apparatus according to a third preferred embodiment of the present invention.

FIG. 21 is a schematic diagram showing a configuration of a vehicle 10 equipped with a velocity measurement apparatus according to a third preferred embodiment of the present invention. According to the first and second preferred embodiments, there is a possibility that a peak of a cross-correlation value for a smooth ground surface does not exceed the threshold value (the threshold value 143 of FIG. 9), and thus, a velocity of the vehicle 10 can not be calculated. In this case, reducing the threshold value may results in an erroneous velocity different from a true velocity due to noises. Accordingly, the velocity measurement apparatus of the third preferred embodiment is configured in a manner similar to that of the first or second preferred embodiment, and is further provided with a Doppler sensor 31. The Doppler sensor 31 is a Doppler velocity meter that measures a velocity of the vehicle 10 using a Doppler frequency, and sends the measured velocity to a calculation unit 13A. In a case where a cross-correlation value is less than a threshold value, the calculation unit 13A uses the velocity generated by the Doppler sensor 31, as a supplement to calculation of a velocity according to the velocity and distance calculation process shown in FIG. 8 (i.e., calculation of a velocity using surface profile data generated by distance sensors 11a and 11b).

When the ground 1 is exposed to a radio wave or a sound wave emitted from the Doppler sensor 31 in an oblique direction, a resulting exposed area 105 spans as shown in FIG. 21. In this case, an apparent velocity seen from the Doppler sensor 31 varies in accordance with a distance from the Doppler sensor 31 to a position in the exposed area 105. More specifically, in a position near the Doppler sensor 31 (particularly, a position immediately below the Doppler sensor 31), the variation of the distance from the Doppler sensor 31 is reduced as compared with a position far from the Doppler sensor 31. In this case, the Doppler frequency contains a plurality of frequency components and occupies some bandwidth. Thus, because the Doppler frequency can not be uniquely determined, an error should occur when measuring a velocity of the vehicle 10 using the Doppler sensor 31.

However, a velocity of the vehicle 10 can be measured at a certain accuracy even when measuring the velocity using the Doppler sensor 31. Therefore, according to the third preferred embodiment, the Doppler sensor 31 is used only as a supplement.

According to the third preferred embodiment of the present invention as described above, the velocity measurement apparatus can use the Doppler sensor 31 for a supplementary measurement of a velocity even in the case of a smooth ground surface. Hence, it is possible to minimize an error by using a combination of surface profile data generated by the distance sensors 11a and 11b and a velocity generated by the Doppler sensor 31.

As described above, according to the third preferred embodiment, the Doppler sensor 31 is used for measuring a velocity in the case where a peak of a cross-correlation value for a smooth ground surface can not be obtained. However, when the smooth ground surface runs for a long distance, the continuous use of the Doppler sensor 31 increases the error. In order to solve this problem, the velocity measurement apparatus according to the third preferred embodiment may be installed on each of the leading vehicle and the last vehicle of a train, and a velocity of the train may be calculated using surface profile data generated by the distance sensors 11a and 11b of one of these two velocity measurement apparatuses in which a peak of a cross-correlation value exceeds the threshold value.

Fourth Preferred Embodiment

Figure 22:
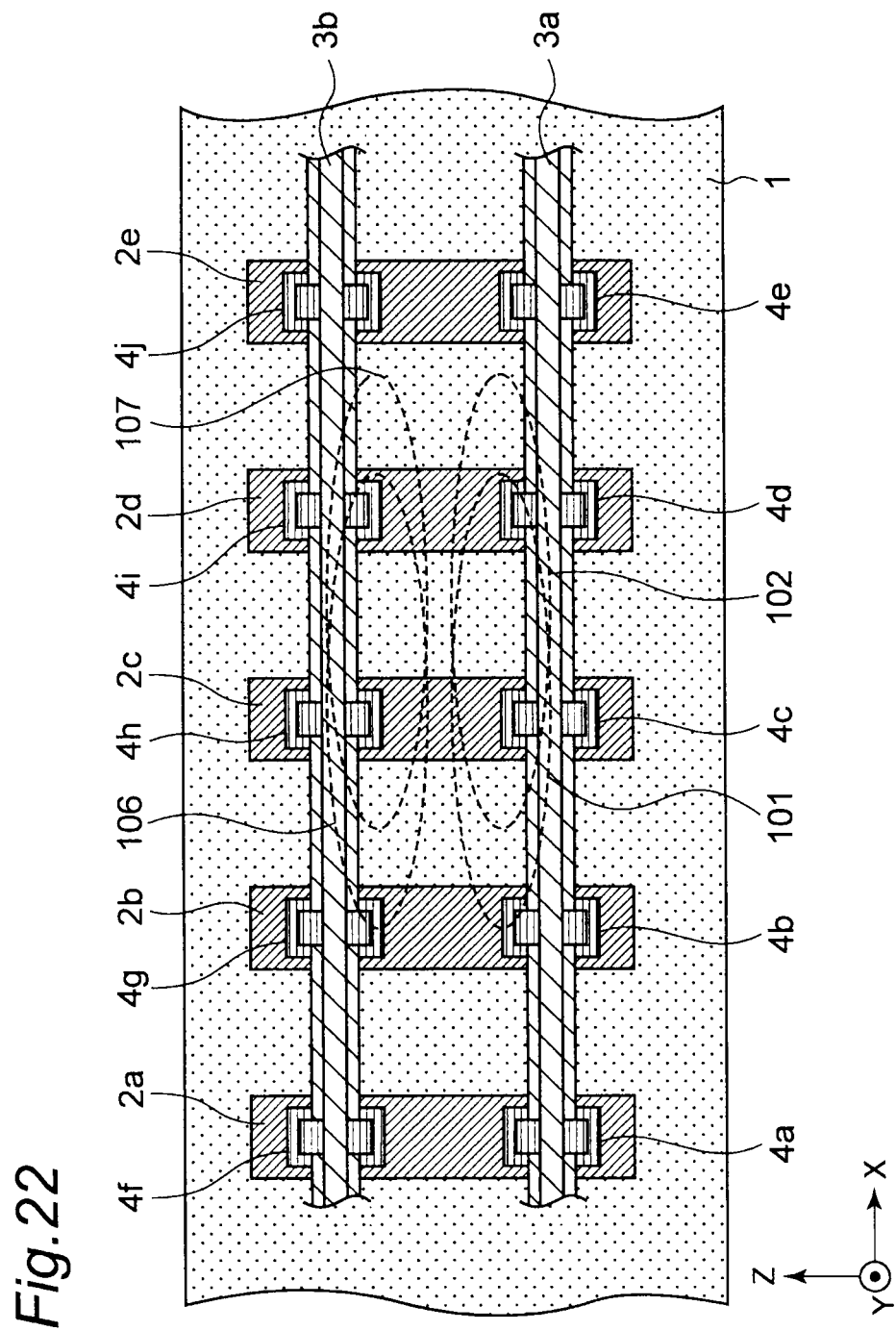
FIG. 22 is a top view of a track, and shows exposed areas 101, 102, 106 and 107 of distance sensors in velocity measurement apparatuses according to a fourth preferred embodiment of the present invention.

FIG. 22 is a top view of a track, and shows exposed areas 101, 102, 106 and 107 of distance sensors in velocity measurement apparatuses according to a fourth preferred embodiment of the present invention. An increased error occurs in a rail section including a very steep curve. This is because the arc length at the middle between rails 3a and 3b (i.e., a position where distance sensors 11a and 11b are provided) is different from that of a position near the rail 3a (i.e., the exposed areas 101 and 102 of the radio waves from the distance sensors 11a and 11b). In order to solve this problem, two velocity measurement apparatuses are installed on a vehicle. One of the velocity measurement apparatuses emits radio waves to the exposed areas 101 and 102 near the rail 3a, and the other of the velocity measurement apparatuses emits radio waves to the exposed areas 106 and 107 near the rail 3b. An average of velocities measured by the two velocity measurement apparatuses is employed. According to the fourth preferred embodiment, it is possible to reduce an error even when the rails 3a and 3b are in a rail section including a very steep curve.

Fifth Preferred Embodiment

Figure 23:
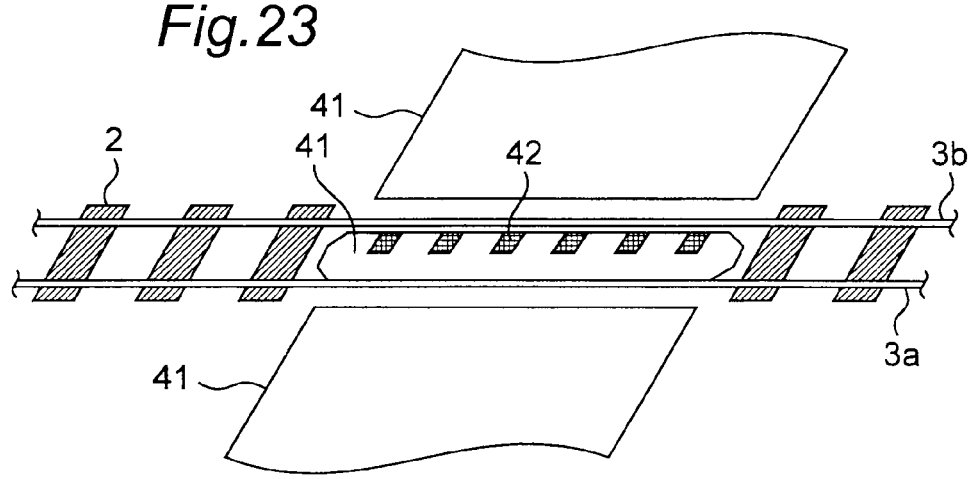
FIG. 23 is a view of a track including radio wave reflectors 42 according to a fifth preferred embodiment of the present invention.

FIG. 23 is a view of a track including radio wave reflectors 42 in a fifth preferred embodiment of the present invention. In a case where a track crosses a road 41 (e.g., a railroad crossing), rail ties 2 and fastening devices can not be exposed in a portion of the track crossing the road 41, and accordingly, it is not possible to acquire sufficient surface profile data. According to the fifth preferred embodiment, radio wave reflectors 42 are arranged along rails 3a and 3b at predetermined intervals, in the portion of the track crossing the road 41 and between the rails 3a and 3b. According to the first preferred embodiment, radio waves are emitted to structures on the ordinary track (e.g., the fastening devices 4a to 4e). On the other hand, according to the fifth preferred embodiment, the additional radio wave reflectors 42 is provided for reflecting a radio wave. Each of the radio wave reflectors 42 may be a corner reflector made of two metal plates. In addition, any materials and structures can be employed as long as such a material or structure achieves strong reflection of a radio wave. As described above, according to the fifth preferred embodiment, it is possible to accurately measure a velocity of a vehicle even at a railroad crossing or the like where rail ties and fastening devices are not exposed.

Sixth Preferred Embodiment

Figure 24:
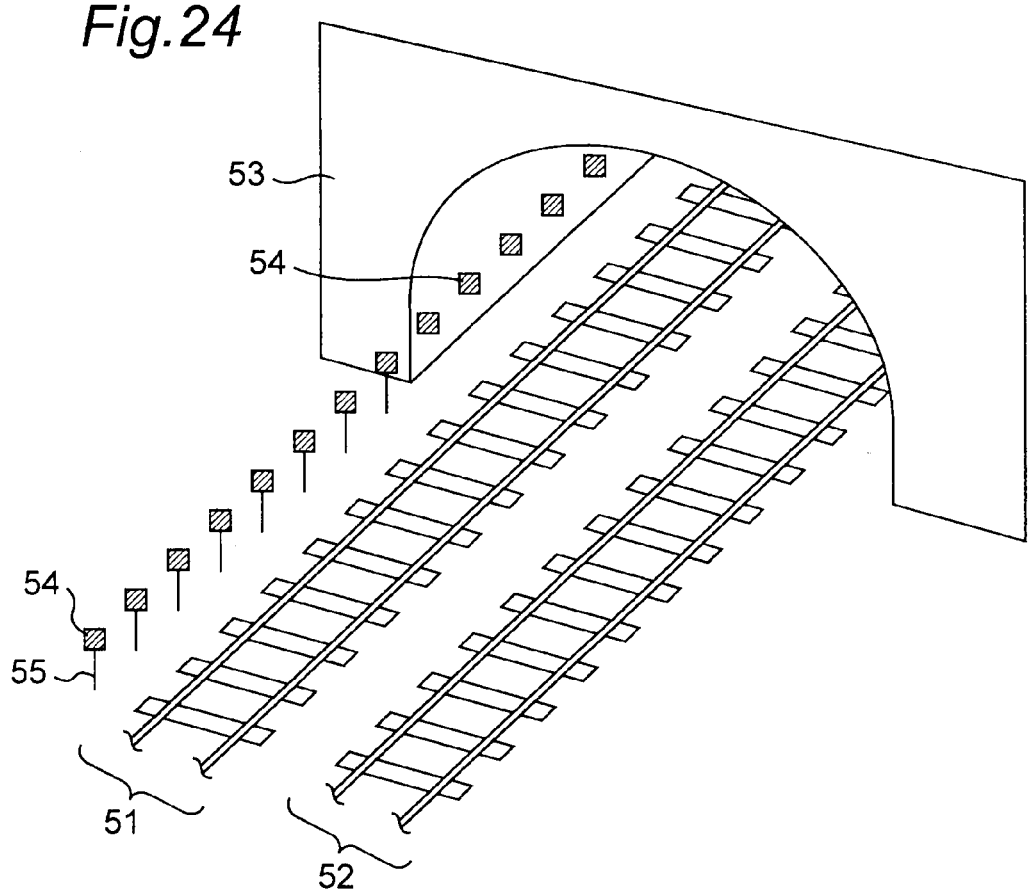
FIG. 24 is a view of a track including radio wave reflectors 54 according to a sixth preferred embodiment of the present invention.

FIG. 24 is a view of a track including radio wave reflectors 54 in a sixth preferred embodiment of the present invention. According to the first to fifth preferred embodiments, the distance sensors are provided on the bottom surface of the vehicle 10, and emit radio waves to the ground surface to measure a velocity of the vehicle 10 relative to the ground surface. The requirement for distance sensors according to a preferred embodiment of the present invention is that a traveling direction of the distance sensors is parallel to a surface onto which the distance sensors emit radio waves. Hence, for example, the distance sensors may be provided on a sidewall of a vehicle 10 and, further, a plurality of radio wave reflectors 54 may be provided periodically along the traveling direction of the vehicle 10 (a longitudinal direction of tracks 51 and 52), at one side of the vehicle 10 with equal distances to the vehicle 10. Each of the radio wave reflectors 54 may be a corner reflector made of two metal plates. In addition, any materials and structures can be employed as long as such a material or structure achieves strong reflection of a radio wave. Each of the radio wave reflectors 54 may be provided on a support 55 or may be provided on a wall of a tunnel 53 or the like. Further, the distance sensors may be provided on a ceiling of the vehicle 10, and the plurality of radio wave reflectors 54 may be provided on a ceiling of the tunnel 53, periodically along the traveling direction of the vehicle 10.

Seventh Preferred Embodiment

Figure 25:
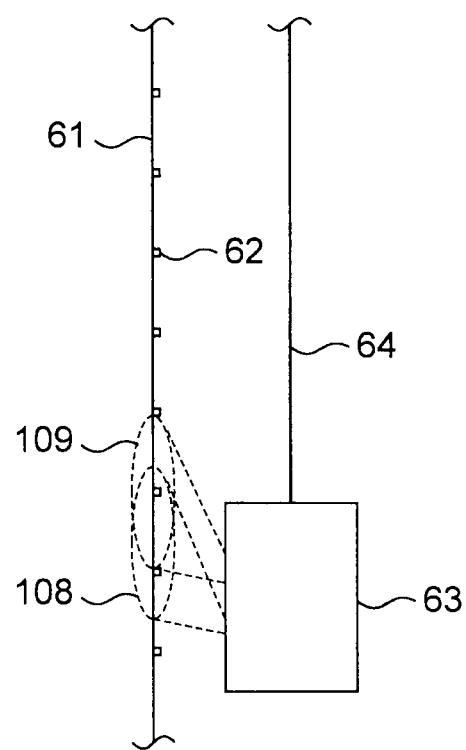
FIG. 25 is a schematic diagram showing a configuration of an elevator apparatus according to a seventh preferred embodiment of the present invention.

FIG. 25 is a schematic diagram showing a configuration of an elevator apparatus according to a seventh preferred embodiment of the present invention. According to the first to sixth preferred embodiments, the vehicle 10 that travels on the track is described as an example. The preferred embodiment of the present invention can be applied to any apparatus as a moving object that moves on a track, including an elevator apparatus as shown in FIG. 25. The elevator apparatus of FIG. 25 is configured to include: a shaft including wall surfaces (only one wall surface 61 is shown for ease of illustration) and a plurality of periodic steel frames 62; and a cage 63 moving up and down the shaft with a rope 64. The cage 63 is provided with a velocity measurement apparatus configured in a manner similar to those in the first preferred embodiment and the like, and two distance sensors of the velocity measurement apparatus emit radio waves to the wall surface 61 and the steel frames 62. One of the distance sensors has an exposed area 108, and the other of the distance sensors has an exposed area 109. Surface profile data is acquired by measuring signal levels of reflected waves corresponding to the radio waves emitted from the distance sensors of the cage 63 and then reflected from the wall surface 61 and the steel frames 62, and measuring propagation durations from the emission of the radio waves to the return of the respective reflected waves. Each of the steel frames 62 causes a peak in the reflected wave. In a manner similar to that of the fifth and sixth preferred embodiments, additional radio wave reflectors for reflecting radio waves may be provided on the wall surface 61.

The preferred embodiment of the present invention can be applied to not only a moving object that travels on a track, but also any ground surfaces and any moving objects as long as surface profile data can be acquired using two distance sensors.

Eighth Preferred Embodiment

Figure 26:
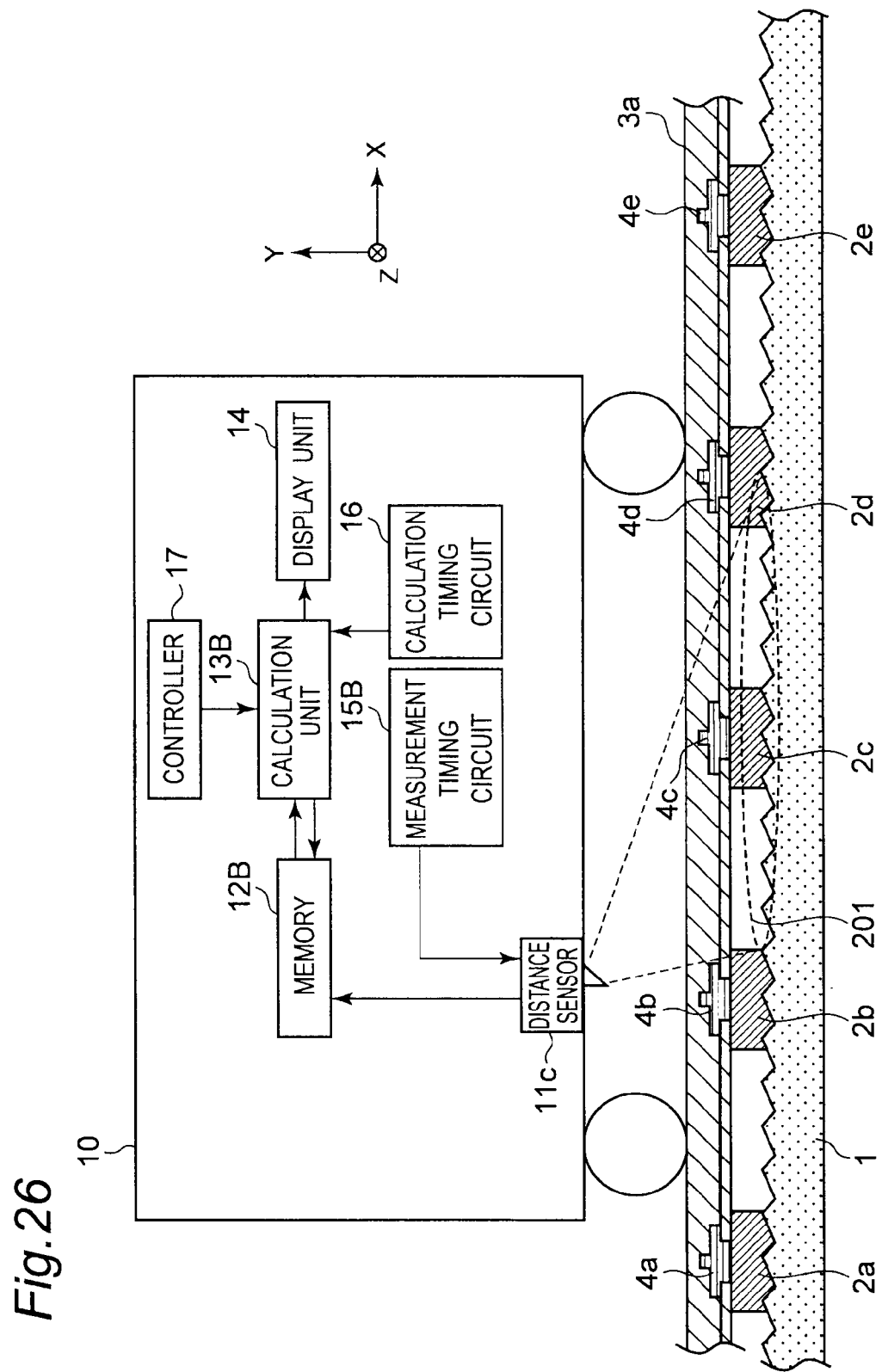
FIG. 26 is a schematic diagram showing a configuration of a vehicle 10 equipped with a velocity measurement apparatus according to an eighth preferred embodiment of the present invention.

FIG. 26 is a schematic diagram showing a configuration of a vehicle 10 equipped with a velocity measurement apparatus according to an eighth preferred embodiment of the present invention. According to the first to seventh preferred embodiments, the velocity measurement apparatus includes the two distance sensors 11a and 11b. On the other hand, the eighth preferred embodiment is characterized by using only one distance sensor 11c for measuring a velocity of the vehicle 10 relative to a ground surface.

The vehicle 10 is provided with: the distance sensor 11c for acquiring surface profile data indicating a profile of the ground surface; a memory 12B for storing the surface profile data; a calculation unit 13B for calculating a velocity and a total travel distance of the vehicle 10; a display unit 14 for displaying the calculation results; a measurement timing circuit 15B for periodically generating measurement pulses for the distance sensor 11c; a calculation timing circuit 16 for periodically generating calculation pulses for the calculation unit 13B; and a controller 17 for inputting to the calculation unit 13B a start point pulse indicating a start point of the total travel distance. The memory 12B stores the surface profile data at least two measurement times (i.e., the preceding surface profile data and the latest surface profile data), among the surface profile data measured by the distance sensor 11c per each measurement pulse. The calculation unit 13B calculates a velocity and a total travel distance of the vehicle 10, by executing a velocity and distance calculation process (which will be described later with reference to FIG. 32) based on the surface profile data stored in the memory 12B, each time receiving the calculation pulse.

Figure 27:
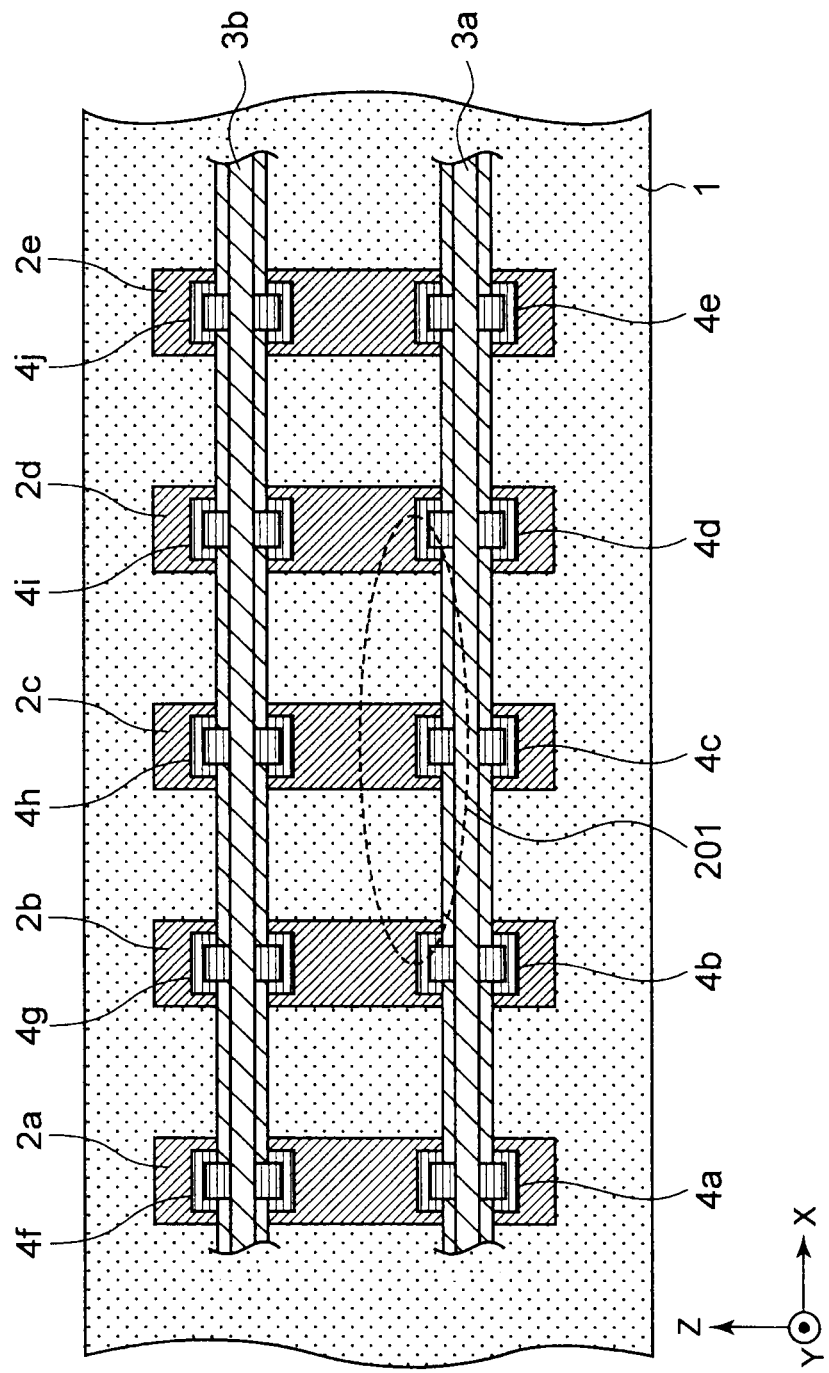
FIG. 27 is a top view of a track, and shows an exposed area 201 of a distance sensor 11c of FIG. 26.

FIG. 27 is a top view of a track, and shows an exposed area 201 of the distance sensor 11c of FIG. 26. The distance sensor 11c emits a radio wave to the ground surface in a manner similar to that of the distance sensors 11a and 11b according to the first preferred embodiment. The distance sensor 11c emits a radio wave in a direction which is inclined forward to a traveling direction of the vehicle 10, so that an area covering from a position immediately below the distance sensor to its forward position, in particular, covering multiple ones of the fastening devices 4a to 4e, is exposed to the radio wave. If the distance sensor 11c emits a radio wave to a too far position, the fastening devices 4a to 4e are not exposed to the radio wave when the vehicle 10 travels through a curve. Therefore, the distance sensor 11c emits a radio wave to, for example, an area covering from a position slightly rearward of the position immediately below the distance sensor 11c (e.g., about 10 cm in a −X direction), to a position about two meters forward. The distance sensor 11c is provided on a bottom surface of the vehicle 10 at a position near the middle between rails 3a and 3b, rather than a position immediately above the rail 3a (or 3b), for example, so that the fastening devices 4a to 4e are exposed to radio waves from oblique directions (i.e., radio waves propagating with Z-component). The distance sensor 11c emits a radio wave having a short wavelength sufficient to observe the fastening devices 4a to 4e. In a case where the fastening devices 4a to 4e include bolts having a diameter of about 40 to 50 mm, the wavelength of the radio wave is preferably about 10 to 30 mm. It is assumed that the radio wave emitted from the distance sensor 11c is polarized orthogonally to a longitudinal direction of the rails 3a and 3b.

Figure 28:
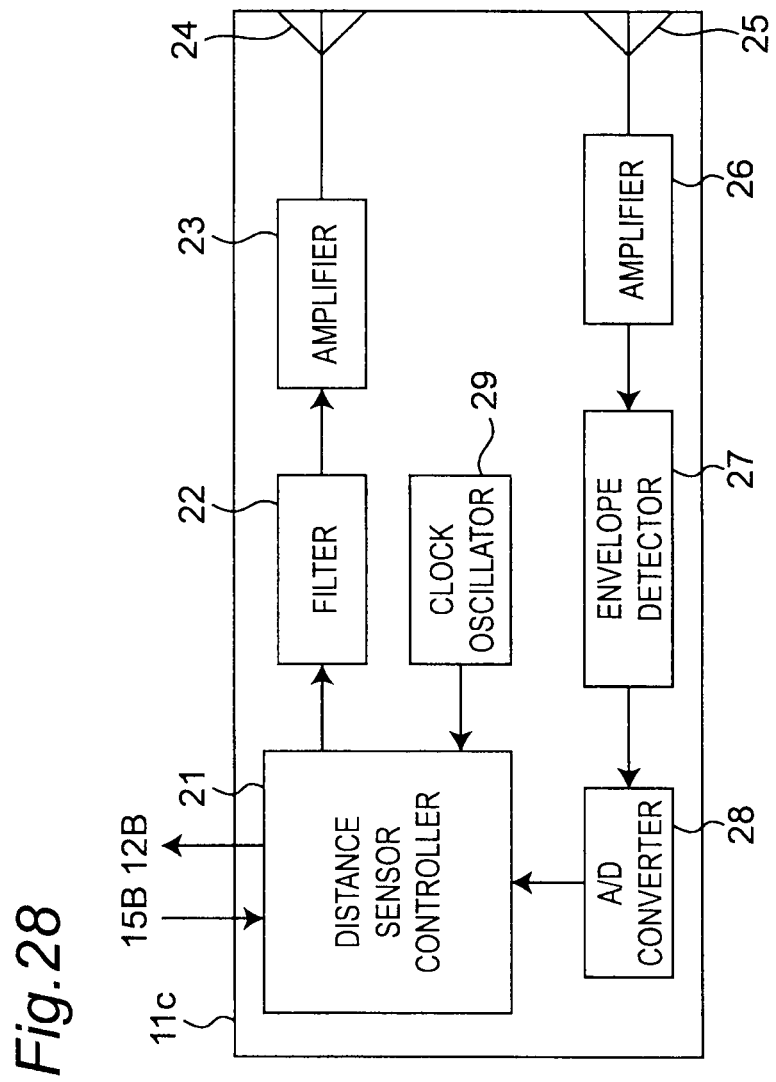
FIG. 28 is a block diagram showing a detailed configuration of the distance sensor 11c of FIG. 26.

FIG. 28 is a block diagram showing a detailed configuration of the distance sensor 11c shown in FIG. 26. The distance sensor 11c has constituent elements similar to those of the distance sensors 11a and 11b according to the first preferred embodiment. In a manner similar to that of the first preferred embodiment, a distance sensor controller 21 continues to take in received signals for a predetermined time so as to receive both the reflected waves from the nearest structure and the farthest structure in the exposed area 201 of the radio wave. As described above, in the case of emitting a radio wave in the exposed area covering from the position slightly rearward of the position immediately below the distance sensor 11c to the position about two meters forward, a duration for taking in the received signal is calculated from "2 [m]/light speed*2=about 13 [nanoseconds]", and therefore, is set to about 20 nanoseconds including a margin.

Figure 32:
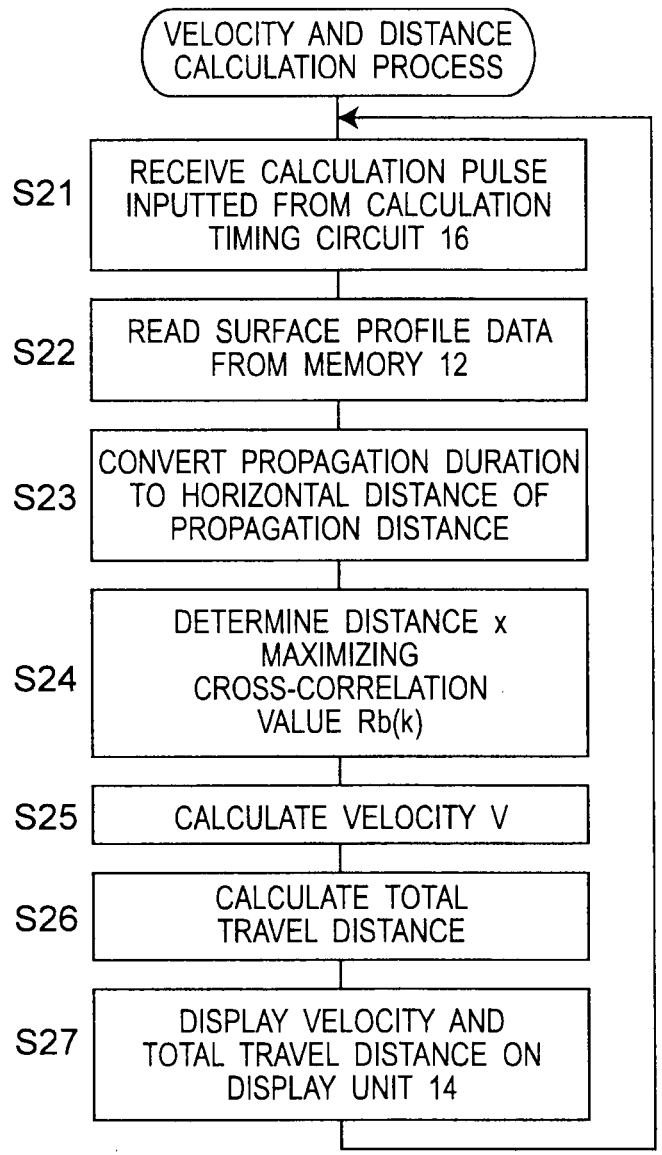
FIG. 32 is a flowchart showing a velocity and distance calculation process executed by a calculation unit 13B of FIG. 26.

FIG. 32 is a flowchart showing a velocity and distance calculation process executed by the calculation unit 13B of FIG. 26.

In step S21, the calculation unit 13B receives a calculation pulse inputted from the calculation timing circuit 16. Each time a calculation pulse is inputted, the calculation unit 13B calculates a velocity of the vehicle 10 and a travel distance since the input of the calculation pulse, from surface profile data stored in the memory 12B. The calculation unit 13B also calculates a total travel distance from the calculated travel distance. In step S22, the calculation unit 13B reads the surface profile data at the preceding measurement time and the surface profile data at the current measurement time from the memory 12B, and stores the surface profile data in an internal temporal memory (not shown). In step S23, the calculation unit 13B converts each propagation duration of the surface profile data into a propagation distance, and further converts each propagation distance into a horizontal distance projected onto the ground surface. The propagation distance is obtained using a relation "propagation duration*light speed/2".

Figure 29:
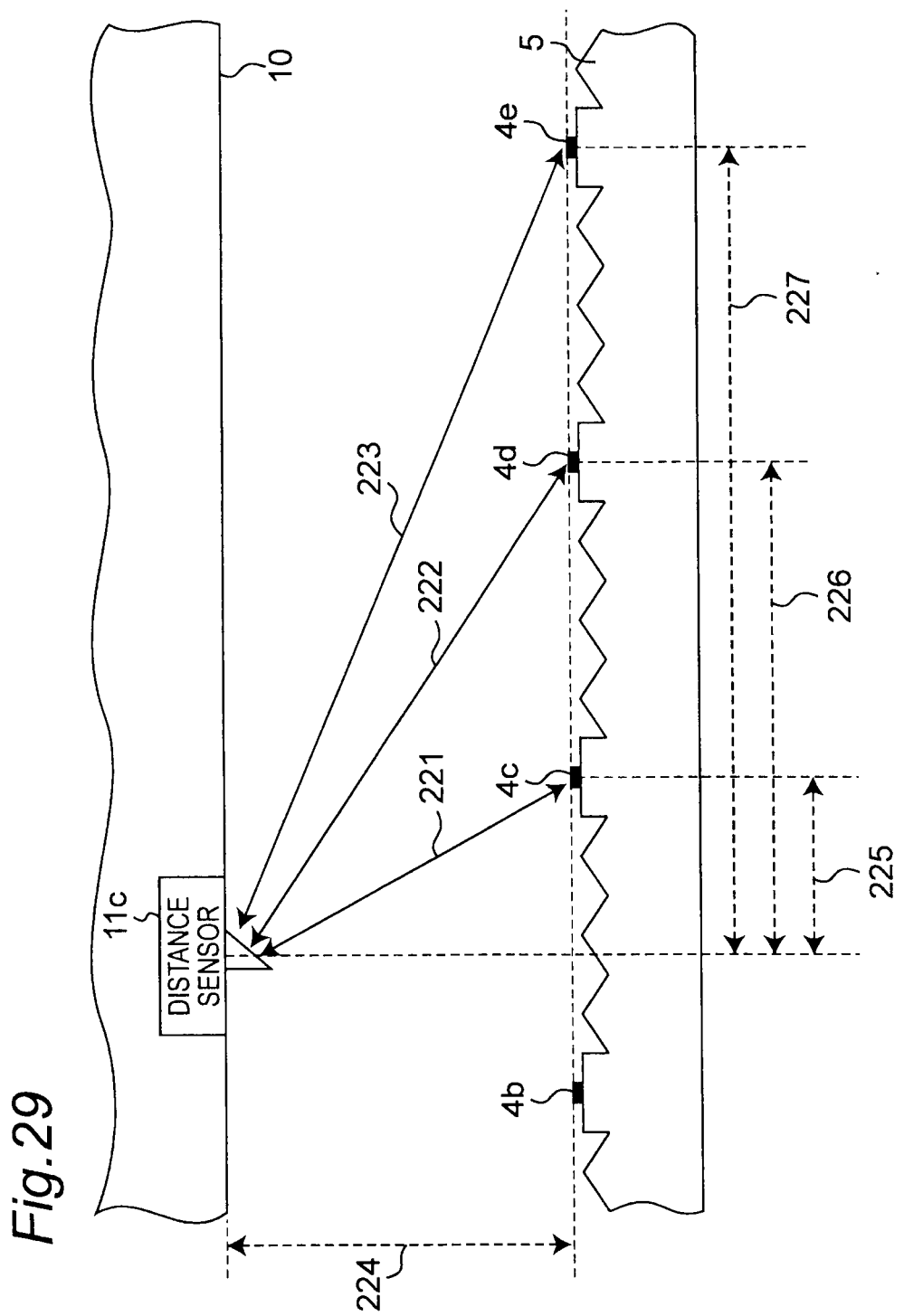
FIG. 29 shows measurement of a ground surface 5 by the distance sensor 11c of FIG. 26.

FIG. 29 shows the measurement of the ground surface 5 by the distance sensor 11c of FIG. 26. For ease of illustration, the ground 1 and rail ties 2a to 2e are collectively shown as the ground surface 5. Referring to FIG. 29, propagation distances 221 to 223 from the distance sensor 11c to the fastening devices 4c to 4e are determined by emitting the radio wave from the distance sensor 11c and receiving the reflected waves from the ground surface. A height 224 from the ground surface 5 to the vehicle 10 is equal to a propagation distance corresponding to a propagation duration when the distance sensor 11c receives a reflected wave from the ground surface 5 (or the fastening device) immediately below, i.e., a minimum of a propagation distance. When "R" denotes the propagation distance and "H" denotes the height 224 from the ground surface 5 to the vehicle 10, a horizontal distance from the distance sensor 11c to a structure on the track (i.e., a distance projected onto the ground surface) can be obtained using the following equation.

$$X = \sqrt{R^2 - H^2} \qquad \text{Equation 3}$$

Using Equation 3, the propagation distances 221 to 223 are converted into horizontal distances 225 to 227. The horizontal distances 225 to 227 are equal to actual distances on the ground surface 5.

Figure 30:
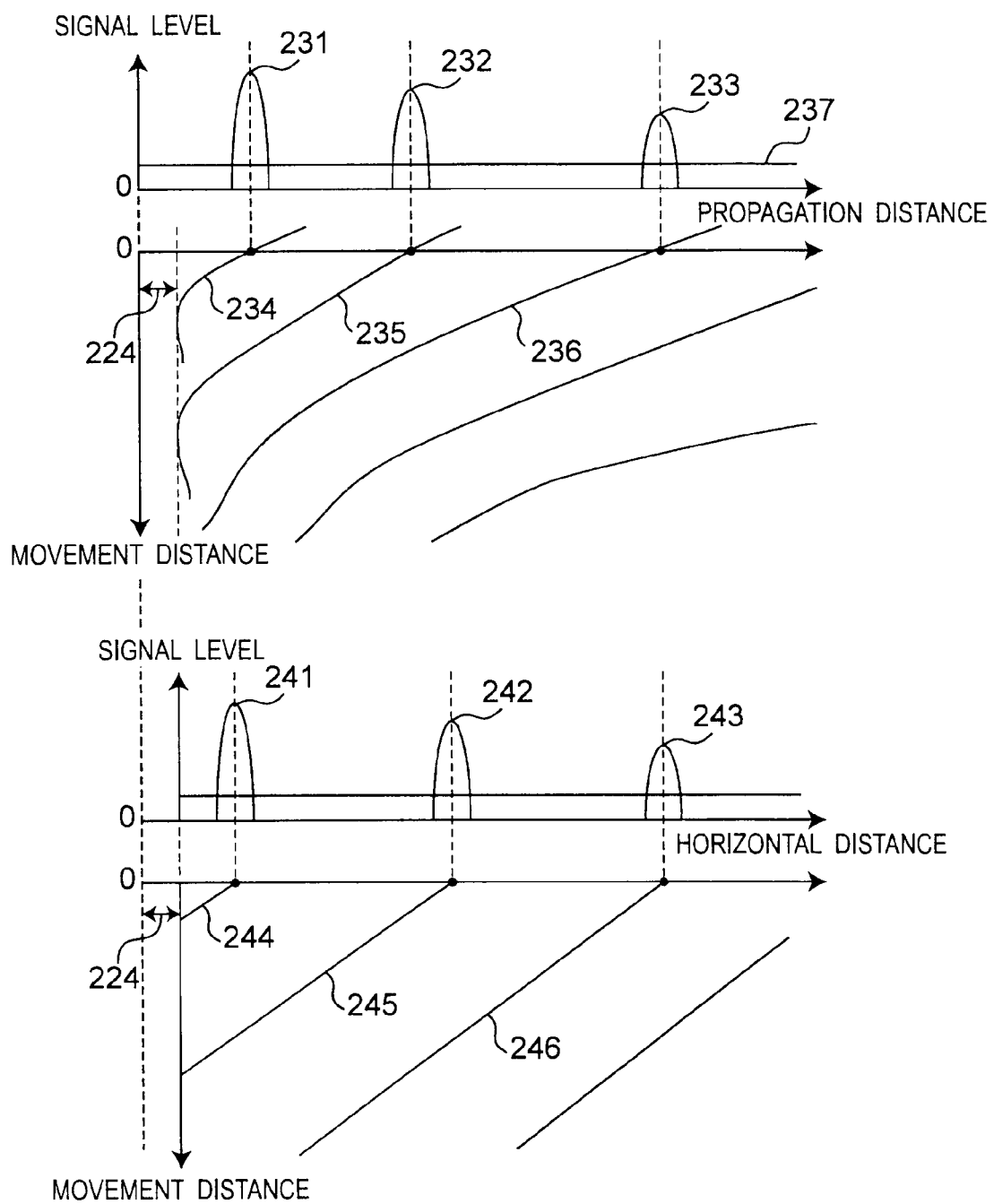
FIG. 30 shows variations of surface profile data in accordance with movement of the vehicle 10.

FIG. 30 shows variations of surface profile data vary in accordance with movement of vehicle 10. The first graph from the top of FIG. 30 shows surface profile data represented by propagation distances (the propagation distances 221 to 223 of FIG. 29). Reflected wave peaks 231 to 233 indicate the propagation distances from the distance sensor 11c to fastening devices 4c to 4e, and the signal levels of the respective reflected waves corresponding to the radio wave reflected from the fastening devices 4c to 4e. The second graph from the top of FIG. 30 shows variations of the reflected wave peaks 231 to 233 in accordance with the movement of the vehicle 10 (denoted with reference numbers 234 to 236, respectively). The second graph also shows surface profile data represented by propagation distances, in a manner similar to that of the first graph. It can be seen from the second graph that the propagation distances gradually decrease as the vehicle 10 travels. As described above, the minimum propagation distance corresponds to the height 224 from the ground surface 5 to the vehicle 10. The calculation unit 13B stores the minimum propagation distance in the internal nonvolatile memory (not shown), and constantly updates the stored minimum during operation. When the power of the velocity measurement apparatus is turned on, the calculation unit 13B reads the minimum propagation distance from the nonvolatile memory. The third graph from the top of FIG. 30 shows surface profile data represented by horizontal distances converted from propagation distances using Equation 3 (the horizontal distances 225 to 227 of FIG. 29). Reflected wave peaks 241 to 243 correspond to the reflected wave peaks 231 to 233 in the first graph, and indicate the horizontal distances from the distance sensor 11c to the fastening devices 4c to 4e, and the signal levels of the respective reflected waves corresponding to the radio wave reflected from the fastening devices 4c to 4e. The fourth graph from the top (i.e., the bottom graph) of FIG. 30 shows variations of the reflected wave peaks 241 to 243 in accordance with the movement of the vehicle 10 (denoted with reference numbers 244 to 246, respectively). The fourth graph also shows surface profile data represented by horizontal distances, in a manner similar to that of the third graph. With respect to the movement of the vehicle 10, whereas the propagation distance varies non-linearly, the horizontal distance varies linearly. Hence, in the case where the vehicle 10 moves with constant velocity, the reflected wave peaks 244 to 246 varies linearly as shown in the fourth graph. In addition, for example, in the case where the fastening devices 4c to 4e are arranged at regular intervals on the ground 1, whereas the propagation distances 221 to 223 are not regularly spaced, the horizontal distances 225 to 227 are regularly spaced.

Figure 31:
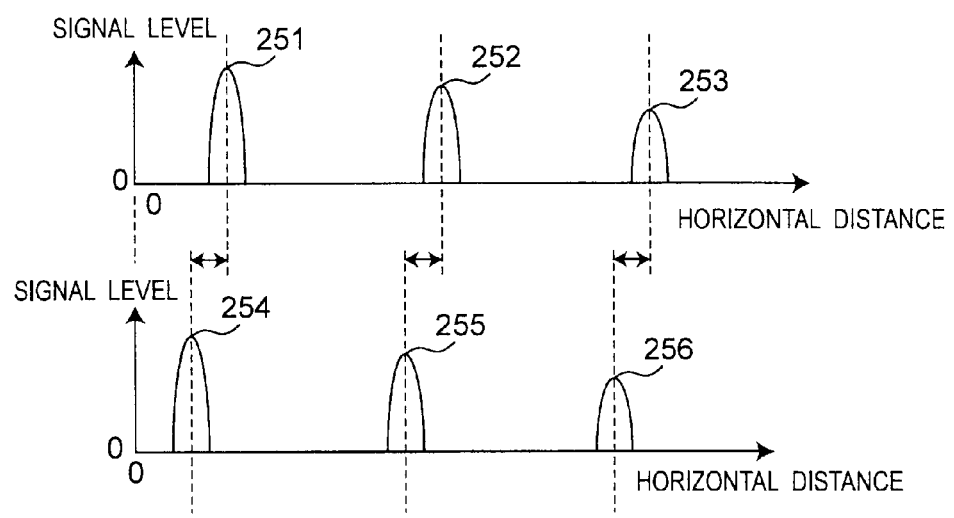
FIG. 31 shows variations of peaks of surface profile data at different measurement times.

In step S24, the calculation unit 13B calculates a cross-correlation value Rb(x) between the surface profile data at the preceding measurement time and the surface profile data at the current measurement time, each having a variable "x" as the horizontal distance, and determines a distance x for maximizing the cross-correlation value Rb(x). This distance x indicates the movement distance of the vehicle 10 during the period from the preceding measurement time to the current measurement time. FIG. 31 shows variations of peaks of surface profile data at different measurement times. Referring to FIG. 31, the top graph shows the surface profile data at the preceding measurement time (including the reflected wave peaks 251 to 253), and the bottom graph shows the surface profile data at the current measurement time (including the reflected wave peaks 254 to 256). Referring to FIG. 31, for example, the reflected wave peaks 251 and 254 indicate peaks of reflected waves from the same fastening device 4c, the reflected wave peaks 252 and 255 indicate peaks of reflected waves from the same fastening device 4d, and the reflected wave peaks 253 and 256 indicate peaks of reflected waves from the same fastening device 4e. In the case of FIG. 31, each of a horizontal distance between the reflected wave peaks 251 and 254, a horizontal distance between the reflected wave peaks 252 and 255, and a horizontal distance between the reflected wave peaks 253 and 256 corresponds to a movement distance during the period from the preceding measurement time to the current measurement time. More specifically, the movement distance during the period from the preceding measurement time to the current measurement time is obtained by determining the distance x for maximizing the cross-correlation value Rb(x) of the following equation.

$$Rb(x) = \sum_{m=1}^{M} A(m-x)B(m) \qquad \text{Equation 4}$$

A(m) represents the surface profile data represented by the horizontal distance m at the preceding measurement time, and B(m) represents the surface profile data represented by the horizontal distance m at the current measurement time. "M" represents the maximum horizontal distance.

In step S25, the calculation unit 13B calculates a velocity of the vehicle 10, by dividing the distance x determined using Equation 4, by the elapsed time from the preceding measurement time to the current measurement time. The elapsed time from the preceding measurement time to the current measurement time is equal to a cycle of measurement pulses from the measurement timing circuit 15B. In step S26, the calculation unit 13B multiplies the calculated velocity by the calculation pulse cycle to calculate a travel distance since the input of the calculation pulse, and sums the calculated travel distance to calculate a total travel distance from a start point (i.e., a position of the vehicle 10 at the time when a start point pulse is inputted from the controller 17). In step S27, the calculation unit 13B displays the velocity and the total travel distance on the display unit 14. Then, the process returns to step S21.

The velocity of the vehicle 10 varies in response to acceleration or deceleration. In this case, the reflected wave peak is not linear unlike that shown in the fourth graph from the top of FIG. 30. However, the velocity measurement apparatus according to this preferred embodiment of the present invention calculates the velocity and the travel distance from the movement distance during the period from the preceding measurement time to the current measurement time, and sums the calculated travel distance. Therefore, a movement distance during a period between two measurement times for calculating a velocity can be clearly determined, irrespective of variations in velocity. In other words, it is possible to accurately calculate a total travel distance irrespective of variations in velocity of the vehicle 10.

Some part of the functions of the calculation unit 13B may be implemented by the distance sensor 11c. For example, the distance sensor 11c may convert a measured propagation duration into a propagation distance. In this case, the memory 12B stores a signal level and the propagation distance as surface profile data, and the calculation unit 13B converts the propagation distance into a horizontal distance in step S23 of FIG. 32. Further, the distance sensor 11c may convert a propagation distance into a horizontal distance. In this case, the memory 12B stores a signal level and the horizontal distance as surface profile data, and step S23 of FIG. 32 is omitted.

Now, a threshold value 237 shown in the top graph of FIG. 30 is further described. The exposed area 201 of the radio wave from the distance sensor 11c has some width perpendicular to a longitudinal direction of the track. Thus, the distance sensor 11c may receive reflected waves from structures outside the rails 3a and 3b. In appearance, a propagation distance to a structure outside the rails 3a and 3b varies slowly as compared with a velocity of the vehicle 10. Accordingly, an error occurs when calculating a velocity based on the reflected waves from the structures outside the rails 3a and 3b. Fortunately, because the structures outside the rails 3a and 3b are located outside the exposed area 201, their received signal levels are low. Hence, the threshold value 237 is appropriately set not to calculate a velocity based on reflected waves having such low signal levels.

Figure 33:
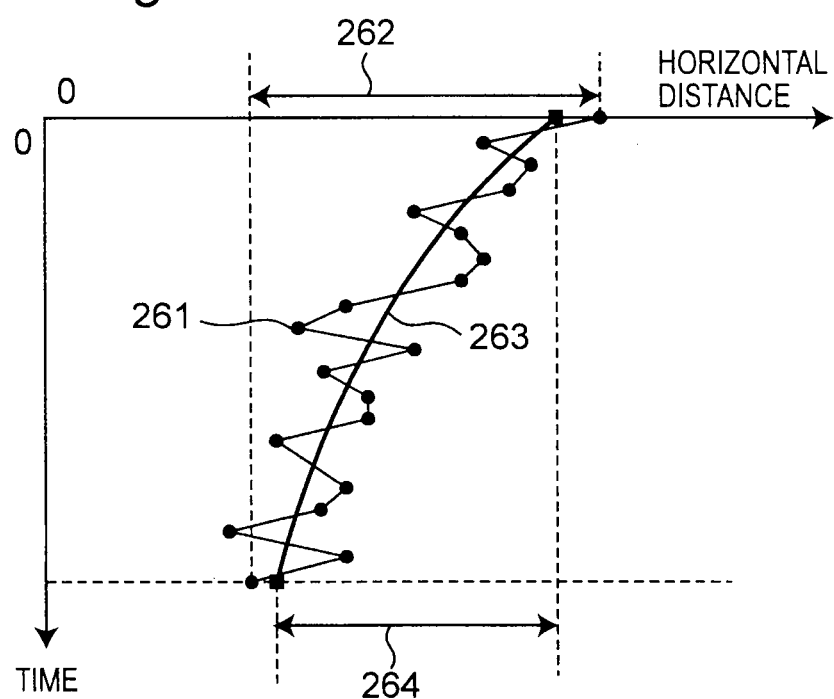
FIG. 33 is a graph for illustrating noise reduction using a Kalman filter.

Further, the errors of the velocity and total travel distance occur because of deviations in the height 224 due to vibrations of the vehicle 10, received noises in the distance sensor 11c, and the like. These error factors appear as an error of a propagation distance and an error of a horizontal distance. In order to reduce these errors, filtering is performed using the surface profile data at the several preceding measurement times. A Kalman filter is the most suitable for this filtering. The Kalman filter can perform the filtering using a dynamic characteristic of the vehicle 10. In a case of using a moving average filter, the filtered result is affected by a sudden noise. However, in the case of using the Kalman filter, the filtered result is not affected by a sudden noise exceeding the dynamic characteristic of the vehicle 10. This feature of the Kalman filter is well known in the art. In addition, the Kalman filter is advantageous to this preferred embodiment of the present invention for the following point. That is, the Kalman filter can use the surface profile data at the first one and the last one of the several consecutive measurement times. In order to reduce errors of the velocity and total travel distance, it is desirable to measure the movement distance of the vehicle 10 for a period of time as long as possible. In the case of employing a moving average filter, the surface profile data at the first one and the last one of the several consecutive measurement times includes errors. On the other hand, the Kalman filter can eliminate errors of the surface profile data at the first one and the last one of the several consecutive measurement times. FIG. 33 is a graph for illustrating noise reduction using the Kalman filter. In this case, the Kalman filter is applied for one reflected wave peak of the surface profile data. A line shown with a reference number 261 indicates variations over time of a reflected wave peak before processing by the Kalman filter. FIG. 33 shows a case that the vehicle 10 decelerates. Each dot on the line of the reflected wave peak 261 indicates a reflected wave peak per each measurement time. A difference between the maximum and minimum horizontal distances of the reflected wave peak 261 corresponds to a fluctuation range 262 before processing by the Kalman filter, and the fluctuation range 262 include a error. A line shown with a reference number 263 indicates variations over time of the reflected wave peak processed by the Kalman filter. It can be seen from the line shown with the reference number 263 that noise is suppressed at the surface profile data at the first one and the last one of the several consecutive measurement times, and it can be seen from the fluctuation range 264 after processing by the Kalman filter that the error is reduced.

According to the eighth preferred embodiment of the present invention as described above, the velocity measurement apparatus emits a radio wave to the structures on the track, such as the ground 1, the rail ties 2a to 2e, and the fastening devices 4a to 4j, from oblique directions, acquires surface profile data including signal levels of reflected waves reflected from these structures, and including propagation durations from the emission of the radio wave to the return of the respective reflected waves, and converts the propagation durations into horizontal distances of a propagation distances. Based on variation over time of the surface profile data represented by the horizontal distance, the velocity measurement apparatus can measure a velocity of the vehicle 10 with a small error, and measure a total travel distance of the vehicle 10 with a small error. According to the eighth preferred embodiment of the present invention, it is possible to accurately obtain a velocity and a total travel distance even in a case where the vehicle 10 travels at very low speed.

In addition, according to the eighth preferred embodiment of the present invention, the velocity measurement apparatus emits a radio wave polarized orthogonally to the longitudinal direction of the rails 3a and 3b. Thus, it is possible to avoid strong reflections from the rails 3a and 3b, to reliably obtain a propagation distance, and to measure a velocity of the vehicle 10 with a small error.

In addition, according to the eighth preferred embodiment of the present invention, the velocity measurement apparatus uses a radio wave having a wavelength of 10 to 30 mm so that the radio wave strongly reflect from the fastening devices 4a to 4j. Accordingly, it is possible to reliably obtain a propagation distance, and to calculate a velocity of the vehicle 10 with a small error.

According to the prior art, a Doppler frequency is often employed for measuring a velocity of the vehicle 10. On the other hand, according to the eighth preferred embodiment of the present invention, a Doppler frequency is not employed at all, surface profile data is acquired by emitting a pulse wave radio wave, and a velocity of the vehicle 10 is calculated from variations over time of the surface profile data acquired by the distance sensor 11c. Therefore, it is possible to measure a velocity of the vehicle 10 with a small error, and calculate a total travel distance of the vehicle 10 with a small error.

Ninth Preferred Embodiment

Figure 34:
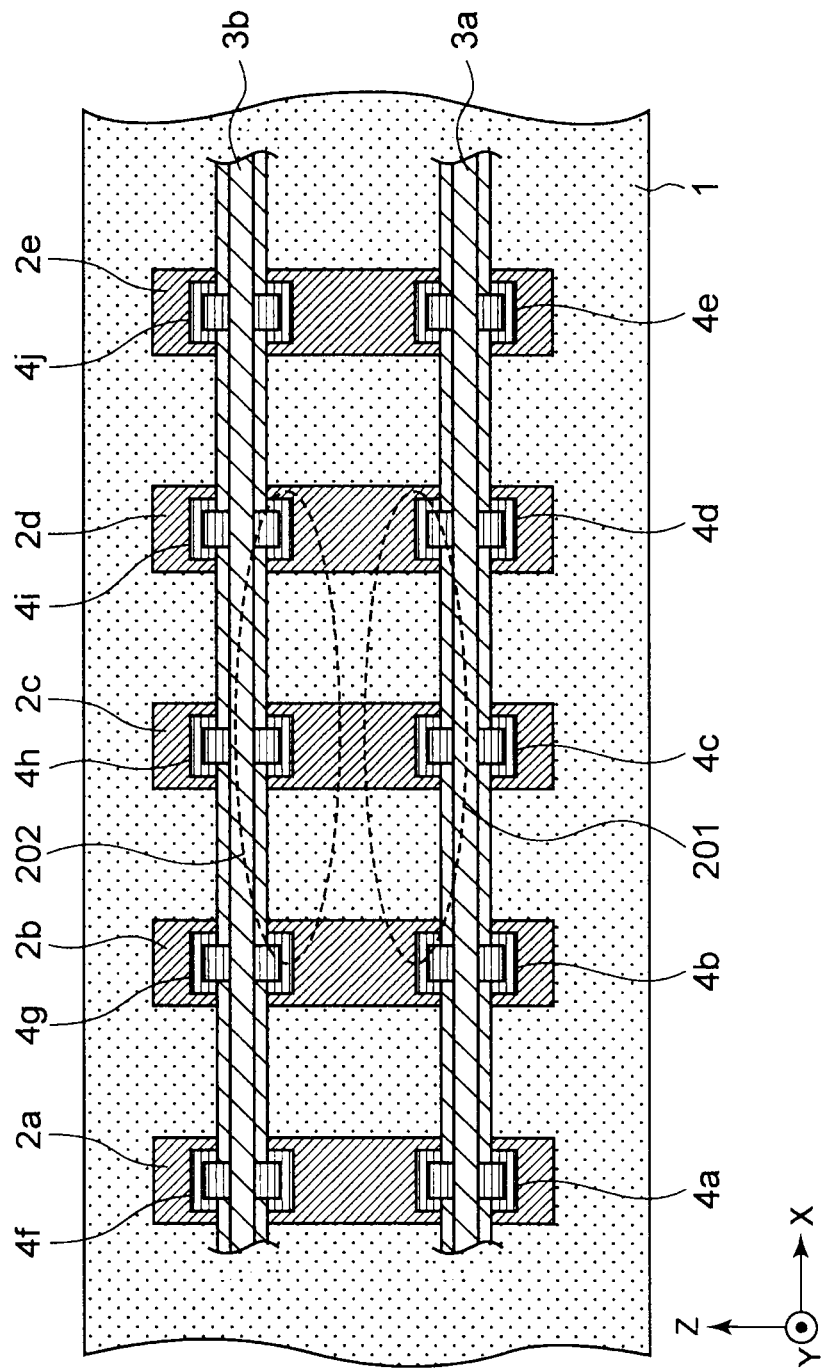
FIG. 34 is a top view of a track, and shows exposed areas 201 and 202 of distance sensors in velocity measurement apparatuses according to a ninth preferred embodiment of the present invention.

FIG. 34 is a top view of a track, and shows exposed areas 201 and 202 of distance sensors in velocity measurement apparatuses according to a ninth preferred embodiment of the present invention. In order to solve a problem that an increased error occurs in a rail section including a very steep curve, two velocity measurement apparatuses are installed on a vehicle in a manner similar to that of the fourth preferred embodiment. One of the velocity measurement apparatuses emits a radio wave to an exposed area 201 near a rail 3a, and the other of the velocity measurement apparatuses emits a radio wave to an exposed area 202 near a rail 3b. An average of velocities measured by the two velocity measurement apparatuses is employed. According to the ninth preferred embodiment, it is possible to reduce an error even when the rails 3a and 3b are in a rail section including a very steep curve.

Tenth Preferred Embodiment

Figure 35:
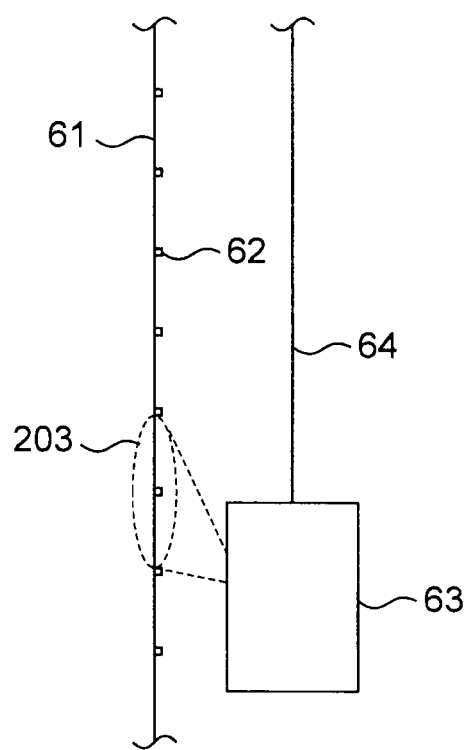
FIG. 35 is a schematic diagram showing a configuration of an elevator apparatus according to a tenth preferred embodiment of the present invention.

FIG. 35 is a schematic diagram showing a configuration of an elevator apparatus according to a tenth preferred embodiment of the present invention. According to the eighth and ninth preferred embodiments, the vehicle 10 that travels on the track is described as an example. The preferred embodiment of the present invention can be applied to any apparatus as a moving object that moves on a track, including an elevator apparatus as shown in FIG. 35. The elevator apparatus of FIG. 35 is configured to include: a shaft including wall surfaces (only one wall surface 61 is shown for ease of illustration) and a plurality of periodic steel frames 62; and a cage 63 moving up and down the shaft with a rope 64. The cage 63 is provided with a velocity measurement apparatus configured in a manner similar to those in the eighth preferred embodiment and the like, and a distance sensor of the velocity measurement apparatus emits a radio wave to the wall surface 61 and the steel frames 62 (an exposed area 203). The distance sensor in the cage 63 acquires surface profile data by emitting a radio wave, measuring signal levels of reflected waves from the wall surface 61 and the steel frames 62, and measuring propagation distances from the distance sensor to the wall surface 61 and the steel frames 62. Each of the steel frames 62 causes a peak in the reflected wave.

The preferred embodiment of the present invention can be applied to not only a moving object that travels on a track, but also any ground surfaces and any moving objects as long as surface profile data can be acquired using a distance sensor.

Each of the velocity measurement apparatuses according to the eighth to tenth preferred embodiments may be combined with each of the tracks including the radio wave reflectors according to the fifth and sixth preferred embodiments.

INDUSTRIAL APPLICABILITY

According to the present invention, it is possible to provide a velocity measurement apparatus capable of accurately measuring a velocity of a moving object relative to a ground surface. Further, it is possible to calculate a total travel distance from a predetermined reference point by integrating the measured velocity. Further, if a route of movement is known in advance, it is also possible to determine a current position from the calculated total travel distance.

According to the present invention, the velocity measurement apparatus acquires surface profile data, by emitting radio waves from two surface profile sensors separated by a predetermined distance from each other, measuring signal levels of reflected waves corresponding to the radio waves emitted and then reflected from various structures on a ground surface, and measuring propagation durations from the emission of the radio waves to the return of the respective reflected waves, and calculates a velocity of a moving object from a difference between surface profile data of the respective surface profile sensors. Therefore, it is possible to accurately measure a velocity of a moving object even when the moving object travels at a low velocity.

According to the present invention, the velocity measurement apparatus acquires surface profile data, by emitting radio waves from two surface profile sensors separated by a predetermined distance from each other, measuring signal levels of reflected waves corresponding to the radio waves emitted and then reflected from various structures on a ground surface, and measuring propagation durations from the emission of the radio waves to the return of the respective reflected waves, and calculates a velocity of a moving object using the obtained data as a whole. Therefore, it is possible to measure a velocity of a moving object with a small error.

In a case where a large number of apparatuses are attached to a bottom surface of a vehicle and radio waves can not be emitted in a direction which is inclined forward to a traveling direction of the vehicle, radio waves are emitted to the positions immediately below distance sensors. In this case, it is possible to measure a velocity of the vehicle with a small error by emitting radio waves to the positions immediately below the distance sensors and receiving a plurality of reflected waves reflected multiple times.

It is possible to accurately measure a velocity of a moving object by emitting a radio wave, acquiring surface profile data from reflected waves reflected from structures on a ground surface, and measuring a movement distance of a vehicle from variations over time of the acquired surface profile data.

In addition, it is possible to accurately obtain a velocity of a vehicle even in a case where the vehicle travels at a very low speed.

It is possible to reliably measure a velocity of a moving object with a small error by emitting a radio wave to rail ties and fastening devices of a railroad, and receiving strong reflected waves from the rail ties and the fastening devices.

It is possible to avoid strong reflection from rail by emitting a radio wave polarized orthogonally to a longitudinal direction of the rails, and reliably measure a velocity of a moving object with a small error.

It is possible to reliably measure a velocity of a moving object with a small error by emitting a radio wave having a wavelength of 10 to 30 mm, and thus achieving strong reflection from a fastening device.

What is claimed is:

1. A velocity measurement apparatus for measuring a velocity of a moving object relative to a ground surface, the velocity measurement apparatus comprising:
    a first surface profile sensor provided on the moving object, the first surface profile sensor acquiring first surface profile data indicating a top profile of a longitudinal section of the ground surface;
    a second surface profile sensor provided on the moving object and separated from the first surface profile sensor by a predetermined distance in a traveling direction of the moving object, the second surface profile sensor acquiring second surface profile data indicating a top profile of a longitudinal section of the ground surface;
    a memory for accumulating first surface profile data acquired by the first surface profile sensor at different measurement times to store the accumulated first surface profile data as first accumulated data, and accumulating second surface profile data acquired by the second surface profile sensor at different measurement times to store the accumulated second surface profile data as second accumulated data; and
    a calculation unit for calculating a velocity of the moving object based on the first and second accumulated data stored in the memory,
    wherein each of the first and second surface profile sensors acquires the corresponding one of the first and second surface profile data by measuring signal levels of reflected waves corresponding to a radio wave emitted to the ground surface and then reflected from a plurality of structures on the ground surface, and measuring propagation durations from the emission of the radio wave to a return of the respective reflected waves, and
    wherein the calculation unit compares the first accumulated data with the second accumulated data, determines a difference between the measurement times of the first and second surface profile data similar to each other, and divides the predetermined distance between the first and second surface profile sensors by the difference between the measurement times to calculate the velocity of the moving object.

2. The velocity measurement apparatus as claimed in claim 1,
    wherein each of the first and second surface profile sensors measures signal levels of reflected waves reflected from a plurality of structures on the ground surface, the respective structures having different distances to the first and second surface profile sensor.

3. The velocity measurement apparatus as claimed in claim 1,
    wherein each of the first and second surface profile sensors measures signal levels of reflected waves reflected different times between the ground surface and a surface of the moving object on which the first and second surface profile sensor is provided.

4. The velocity measurement apparatus as claimed in claim 1,
wherein the memory decimates the first and second accumulated data with respect to the measurement times to accumulate the first and second surface profile data for longer measurement times.

5. The velocity measurement apparatus as claimed in claim 1,
wherein the ground surface is a railroad including rail ties and fastening devices.

6. The velocity measurement apparatus as claimed in claim 1,
wherein the ground surface is a railroad including rails, and
wherein each of the first and second surface profile sensors emits a radio wave polarized orthogonally to a longitudinal direction of the rails.

7. The velocity measurement apparatus as claimed in claim 1,
wherein each of the first and second surface profile sensors emits a radio wave having a wavelength of 10 to 30 mm.

8. The velocity measurement apparatus as claimed in claim 1, further comprising a Doppler velocity meter for measuring a velocity of the moving object relative to the ground surface.

9. The velocity measurement apparatus as claimed in claim 1,
wherein the calculation unit calculates a total travel distance of the moving object from a predetermined reference point by calculating a travel distance for a predetermined time based on the calculated velocity, and summing the calculated travel distance.

10. A velocity measurement apparatus for measuring a velocity of a moving object relative to a ground surface, the velocity measurement apparatus comprising:
a surface profile sensor provided on the moving object, and acquiring surface profile data indicating a top profile of a longitudinal section of the ground surface;
a memory for storing the surface profile data acquired by the surface profile sensor; and
a calculation unit for calculating a velocity of the moving object based on the surface profile data stored in the memory,
wherein the surface profile sensor acquires the surface profile data by emitting a radio wave to the ground surface, measuring signal levels of reflected waves reflected from a plurality of structures on the ground surface, the respective structures having different distances to the surface profile sensor, and measuring propagation durations from the emission of the radio wave to a return of the respective reflected waves,
wherein the surface profile sensor acquires the surface profile data at a plurality of measurement times including at least first and second measurement times, the surface profile sensor acquiring first surface profile data at the first measurement time, and acquiring second surface profile data at the second measurement time, and
wherein the calculation unit converts each of the propagation durations of the first and second surface profile data into a propagation distance from the surface profile sensor to each structure, converts each propagation distance into a horizontal distance projected onto the ground surface, determines a difference between the horizontal distances of the first and second surface profile data similar to each other, and divides the difference between the horizontal distances by a difference between the first and second measurement times to calculate the velocity of the moving object.

11. The velocity measurement apparatus as claim in claim 10,
wherein the calculation unit applied a Kalman filter for the surface profile data at the plurality of measurement times.

12. The velocity measurement apparatus as claimed in claim 10,
wherein the ground surface is a railroad including rail ties and fastening devices.

13. The velocity measurement apparatus as claimed in claim 10,
wherein the ground surface is a railroad including rails, and
wherein the surface profile sensor emits a radio wave polarized orthogonally to a longitudinal direction of the rails.

14. The velocity measurement apparatus as claimed in claim 10,
wherein the surface profile sensor emits a radio wave having a wavelength of 10 to 30 mm.

15. The velocity measurement apparatus as claimed in claim 10,
wherein the calculation unit calculates a total travel distance of the moving object from a predetermined reference point by calculating a travel distance for a predetermined time based on the calculated velocity, and summing the calculated travel distance.

* * * * *